(12) United States Patent
Sugaya et al.

(10) Patent No.: US 11,903,030 B2
(45) Date of Patent: *Feb. 13, 2024

(54) COMMUNICATION APPARATUS

(71) Applicant: Sony Group Corporation, Tokyo (JP)

(72) Inventors: Shigeru Sugaya, Tokyo (JP); Yuichi Morioka, Tokyo (JP)

(73) Assignee: SONY GROUP CORPORATION, Toyko (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,238

(22) Filed: Dec. 21, 2022

(65) Prior Publication Data

US 2023/0128415 A1 Apr. 27, 2023

Related U.S. Application Data

(63) Continuation of application No. 17/261,878, filed as application No. PCT/JP2019/028753 on Jul. 23, 2019, now Pat. No. 11,558,901.

(30) Foreign Application Priority Data

Aug. 6, 2018 (JP) .................................. 2018-147611

(51) Int. Cl.
H04W 74/08 (2009.01)
(52) U.S. Cl.
CPC ............................. H04W 74/0816 (2013.01)
(58) Field of Classification Search
CPC ...................... H04W 74/0816; H04W 74/0866
See application file for complete search history.

(56) References Cited

U.S. PATENT DOCUMENTS 6,404,756 B1   6/2002 Whitehill et al.
9,503,339 B2  11/2016 Gong et al.
(Continued)

FOREIGN PATENT DOCUMENTS

JP   2003-348635 A   12/2003
JP   2013-541293 A   11/2013
(Continued)

OTHER PUBLICATIONS

International Search Report and Written Opinion dated Oct. 15, 2019, received for PCT Application PCT/JP2019/028753, Filed on Jul. 23, 2019, 16 pages.

Primary Examiner — James P Duffy
(74) Attorney, Agent, or Firm — XSENSUS LLP

(57) ABSTRACT

A communication apparatus is provided, and the communication apparatus includes a control unit that performs control to: generate channel information relating to transmittable frequency channels of data, and bandwidth information relating to a bandwidth of a frequency to be used to transmit the data; transmit a request signal to another communication apparatus, by using a frequency channel that has been selected from the transmittable frequency channels, the request signal including the channel information and the bandwidth information that have been generated; and transmit the data to the other communication apparatus, by using frequency channels that have been selected as receivable frequency channels by the other communication apparatus. The present technology can be applied, for example, to a wireless LAN system.

6 Claims, 17 Drawing Sheets

(56) References Cited

U.S. PATENT DOCUMENTS

| | | |
|---|---|---|
| 11,558,901 B2 * | 1/2023 | Sugaya ............. H04W 74/0816 |
| 2015/0188675 A1 | 7/2015 | Abeysekera et al. |
| 2016/0353357 A1 | 12/2016 | Asterjadhi et al. |
| 2017/0149547 A1 | 5/2017 | Kim et al. |
| 2017/0181039 A1 | 6/2017 | Adachi et al. |
| 2017/0238286 A1 | 8/2017 | Chun et al. |

FOREIGN PATENT DOCUMENTS

| | | |
|---|---|---|
| JP | 2014-195266 A | 10/2014 |
| JP | 2017-533671 A | 11/2017 |
| WO | WO-2016088727 A1 | 6/2016 |

\* cited by examiner

FIG. 6

| Frame Control | Duration | Address 1 | Address 2 | Address 3 | Sequence Control | Address 4 | QoS Control | HT Control | Frame Body | FCS |

FIG. 7

| Frame Control | Duration | Transmit Address | Receive Address | Available Channel Map | Requirement Bandwidth | FCS |

FIG. 8

| Available Channel Map | | | |
|---|---|---|---|
| 0 | 36 | 16 | 100 |
| 1 | 40 | 17 | 104 |
| 2 | 44 | 18 | 108 |
| 3 | 48 | 19 | 112 |
| 4 | 52 | 20 | 116 |
| 5 | 56 | 21 | 120 |
| 6 | 60 | 22 | 124 |
| 7 | 64 | 23 | 128 |
| 8 | 68 | 24 | 132 |
| 9 | 72 | 25 | 136 |
| 10 | 76 | 26 | 140 |
| 11 | 80 | 27 | 144 |
| 12 | 84 | 28 | 148 |
| 13 | 88 | 29 | 152 |
| 14 | 92 | 30 | 156 |
| 15 | 96 | 31 | 160 |

FIG. 9

| Requirement Bandwidth | |
|---|---|
| 0 | 20MHz |
| 1 | 40MHz |
| 2 | 60MHz |
| 3 | 80MHz |
| 4 | 100MHz |
| 5 | 120MHz |
| 6 | 140MHz |
| 7 | 160MHz |
| 8 | 180MHz |
| 9 | 200MHz |
| 10 | 220MHz |
| 11 | 240MHz |
| 12 | 260MHz |
| 13 | 280MHz |
| 14 | 300MHz |
| 15 | 320MHz |

FIG. 10

| Frame Control | Duration | Receive Address | FCS |
|---|---|---|---|

FIG. 11

| Frame Control | Duration | Transmit Address | Receive Address | Available Channel Map | BA Control | BA Information | FCS |

FIG. 12

| Frame Control | Duration | Transmit Address | Receive Address | BA Control | BA Information | FCS |

COMMUNICATION APPARATUS

CROSS-REFERENCE TO RELATED APPLICATIONS

The present application is a continuation of U.S. patent application Ser. No. 17/261,878, filed Jan. 21, 2021, which is based on PCT filing PCT/JP2019/028753, filed Jul. 23, 2019, which claims priority to JP 2018-147611, filed Aug. 6, 2018, the entire contents of each are incorporated herein by reference.

TECHNICAL FIELD

The present technology relates to a communication apparatus, and in particular, a communication apparatus that has enabled communication to be performed by using an idle channel in accordance with a use state of a plurality of frequency channels.

BACKGROUND ART

A conventional wireless local area network (LAN) system has been designed to basically use a frequency bandwidth of 20 MHz as a communication method conforming to the IEEE 802.11a or IEEE 802.11g standard serving as a standard using orthogonal frequency division multiplexing (OFDM), and this has been defined to be one frequency channel.

However, due to a need for an increase in communication speed, in the IEEE 802.11n standard serving as a succeeding standard, a technology for simultaneously transmitting data by using two adjacent frequency channels has been employed.

Moreover, in order to further cope with speeding-up, in the IEEE 802.11ac standard, a channel bonding technology for combining and using more frequency channels has been employed, and a technology for simultaneously using 8 channels, that is, a frequency bandwidth of 160 MHz, at maximum has been disclosed.

As described above, it is expected that demand for speeding-up will further increase in the future, and therefore it is assumed that communication is performed by using even more frequency channels.

Furthermore, as a technology that relates to communication using a plurality of frequency channels in a wireless LAN system, for example, the technology disclosed in Patent Document 1 is known. Patent Document 1 described above discloses a technology for selecting one frequency channel that a receiver can use in transmission or reception from among a plurality of frequency channels.

CITATION LIST

Patent Document

Patent Document 1: Japanese National Publication of International Patent Application No. 2017-533671

SUMMARY OF THE INVENTION

Problems to be Solved by the Invention

Meanwhile, in performing communication using a plurality of frequency channels, it is assumed that communication is performed by using an idle channel in accordance with a use state of the plurality of frequency channels. However, a scheme for selecting such an idle channel and performing communication has not been established, and it has been requested that such a scheme be established.

The present technology has been created in view of such circumstances, and enables communication to be performed by using an idle channel in accordance with a use state of a plurality of frequency channels.

Solutions to Problems

A communication apparatus in one aspect of the present technology is a communication apparatus that includes a control unit that performs control to: generate channel information relating to transmittable frequency channels of data, and bandwidth information relating to a bandwidth of a frequency to be used to transmit the data; transmit a request signal to another communication apparatus, by using a frequency channel that has been selected from the transmittable frequency channels, the request signal including the channel information and the bandwidth information that have been generated; and transmit the data to the other communication apparatus, by using frequency channels that have been selected as receivable frequency channels by the other communication apparatus.

In a communication apparatus in one aspect of the present technology, channel information relating to transmittable frequency channels of data, and bandwidth information relating to a bandwidth of a frequency to be used to transmit the data are generated, a request signal is transmitted to another communication apparatus, by using a frequency channel that has been selected from the transmittable frequency channels, the request signal including the channel information and the bandwidth information that have been generated, and the data is transmitted to the other communication apparatus, by using frequency channels that have been selected as receivable frequency channels by the other communication apparatus.

A communication apparatus in one aspect of the present technology is a communication apparatus that includes a control unit that performs control to: receive a request signal to be transmitted from another communication apparatus, by using a frequency channel that has been selected from transmittable frequency channels, the request signal including channel information relating to the transmittable frequency channels that enable the other communication apparatus to transmit data, and bandwidth information relating to a bandwidth of a frequency to be used to transmit the data; select a receivable frequency channel from the transmittable frequency channels on the basis of the channel information and the bandwidth information that are included in the request signal that has been received; and transmit a response signal to the other communication apparatus, by using the receivable frequency channel that has been selected.

In a communication apparatus in one aspect of the present technology, a request signal to be transmitted from another communication apparatus is received, by using a frequency channel that has been selected from transmittable frequency channels, the request signal including channel information relating to the transmittable frequency channels that enable the other communication apparatus to transmit data, and bandwidth information relating to a bandwidth of a frequency to be used to transmit the data, a receivable frequency channel is selected from the transmittable frequency channels on the basis of the channel information and the bandwidth information that are included in the request signal that has been received, and a response signal is transmitted to the other communication apparatus, by using the receivable frequency channel that has been selected.

A communication apparatus in one aspect of the present technology is a communication apparatus that includes a control unit that performs control to: transmit data to another communication apparatus, by using a first frequency channel; generate a request signal requesting acknowledgment of normal reception of the data, the request signal including channel information relating to transmittable frequency channels that enable the other communication apparatus to transmit an acknowledgment signal; and transmit the request signal that has been generated to the other communication apparatus, by using a second frequency channel that has been selected from the transmittable frequency channels.

In a communication apparatus in one aspect of the present technology, data is transmitted to another communication apparatus, by using a first frequency channel, a request signal requesting acknowledgment of normal reception of the data is generated, the request signal including channel information relating to transmittable frequency channels that enable the other communication apparatus to transmit an acknowledgment signal, and the request signal that has been generated is transmitted to the other communication apparatus, by using a second frequency channel that has been selected from the transmittable frequency channels.

A communication apparatus in one aspect of the present technology is a communication apparatus that includes a control unit that performs control to: receive data to be transmitted from another communication apparatus, by using a first frequency channel; receive a request signal to be transmitted from the other communication apparatus, by using a second frequency channel, the request signal requesting acknowledgment of normal reception of the data and including channel information relating to transmittable frequency channels that enable an acknowledgment signal to be transmitted; select a frequency channel from the transmittable frequency channels on the basis of the channel information included in the request signal that has been received, in a case where the data has been received normally; and transmit the acknowledgment signal to the other communication apparatus, by using the frequency channel that has been selected.

In a communication apparatus in one aspect of the present technology, data that has been transmitted from another communication apparatus is received, by using a first frequency channel, a request signal to be transmitted from the other communication apparatus is received, by using a second frequency channel, the request signal requesting acknowledgment of normal reception of the data and including channel information relating to transmittable frequency channels that enable an acknowledgment signal to be transmitted, a frequency channel is selected from the transmittable frequency channels on the basis of the channel information included in the request signal that has been received, in a case where the data has been received normally, and the acknowledgment signal is transmitted to the other communication apparatus, by using the frequency channel that has been selected.

Note that a communication apparatus in one aspect of the present technology may be an independent apparatus, or may be an internal block that is included in one apparatus.

Effects of the Invention

In one aspect of the present technology, communication can be performed by using an idle channel in accordance with a use state of a plurality of frequency channels.

Note that the effect described here is not necessarily restrictive, and any of the effects described in the present disclosure may be exhibited.

BRIEF DESCRIPTION OF DRAWINGS

FIG. 6 is a diagram illustrating an example of a configuration of a data frame.

FIG. 7 is a diagram illustrating an example of a configuration of a multichannel RTS frame to which the present technology has been applied.

FIG. 8 is a diagram illustrating an example of a parameter of channel information in a bitmap format of a map.

FIG. 9 is a diagram illustrating an example of a parameter of bandwidth information.

FIG. 10 is a diagram illustrating an example of a configuration of a CTS frame.

FIG. 11 is a diagram illustrating an example of a configuration of a multichannel BAR frame to which the present technology has been applied.

FIG. 12 is a diagram illustrating an example of a configuration of a block ACK frame.

MODE FOR CARRYING OUT THE INVENTION

Figure 1:
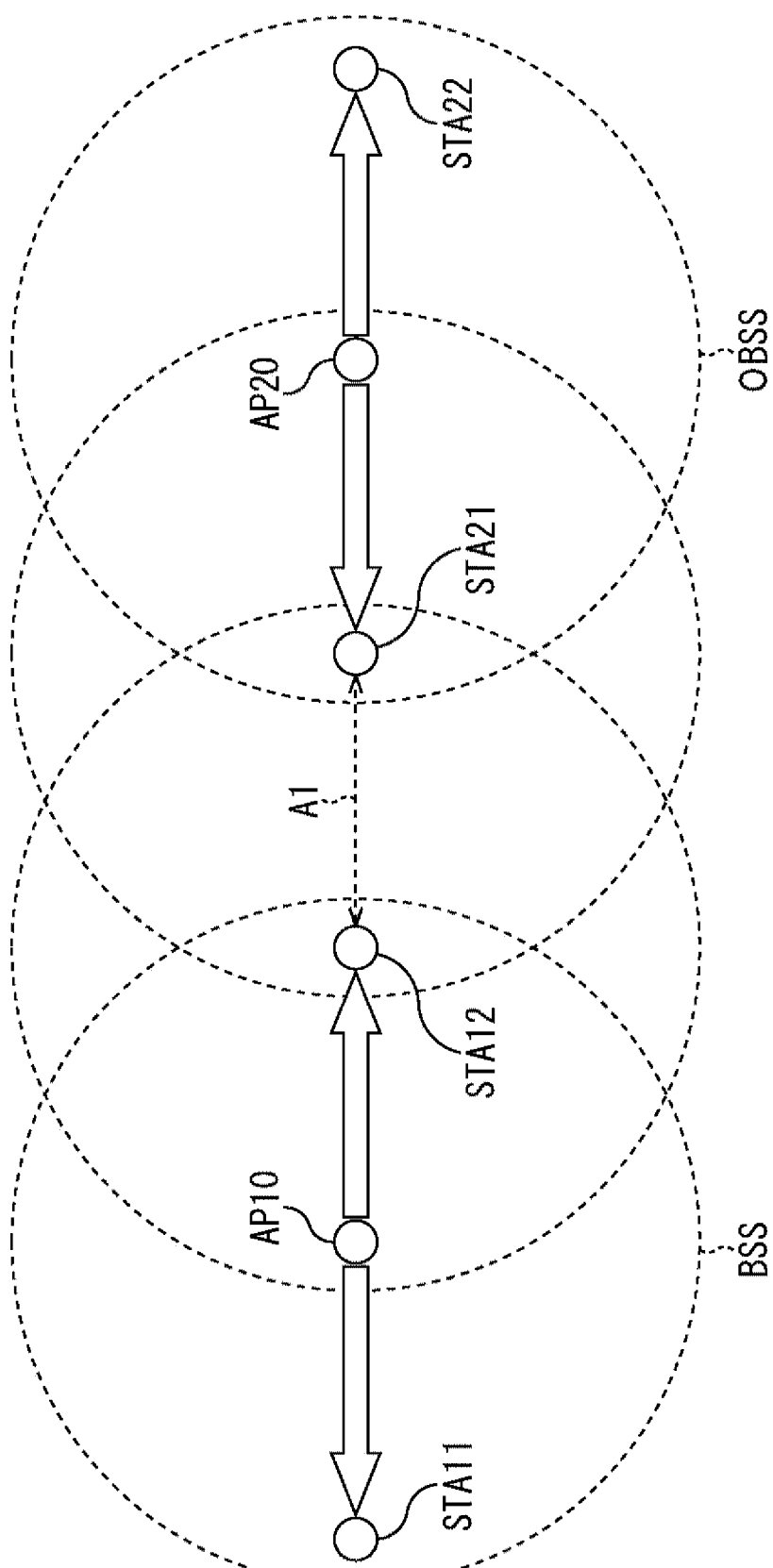
FIG. 1 is a diagram illustrating an example of a configuration of a wireless network.

An embodiment of the present technology is described below with reference to the drawings. Note that description is provided in the order described below.

1. Embodiment of the present technology
2. Variations

1. Embodiment of the Present Technology

As described above, a conventional wireless LAN system copes with an increase in communication speed, for example, by employing a technology for simultaneously transmitting data by using two adjacent frequency channels or by employing a channel bonding technology in which 8 channels, that is, a frequency bandwidth of 160 MHz, at maximum, can be simultaneously used. However, it is expected that demand for speeding-up will further increase in the future, and therefore it is assumed that communication is performed by using even more frequency channels.

As a conventional communication method using multiple channels (a plurality of frequency channels) in these wireless LAN systems, a configuration has been employed in which, in a case where predetermined access control has been performed on a primary channel to enable access to a transmission line, if another secondary channel is not used, communication can be performed by using the secondary channel in addition to the primary channel.

For example, according to the configuration disclosed in Document A described below, a technology has been disclosed in which, in a case where an access point (AP) performs multiuser transmission to a plurality of terminals, channel information allocated in advance to each of the terminals is transmitted as a request to send (RTS) frame (a multiuser RTS) by using a primary channel, and data is transmitted upon receipt of a clear to send (CTS) frame from each of the terminals.

Document A: International Publication No. 2016/143718

Furthermore, as an access control method in a conventional wireless LAN system, a technology has been widely used in which a use state of a transmission line is grasped due to carrier detection, and transmission is enabled in a case where the transmission line has not been used during a predetermined time period.

Moreover, in order to reliably receive a signal in a communication apparatus on a reception side, an access control procedure using virtual carrier detection for exchanging an RTS frame and a CTS frame prior to data transmission, and setting a network allocation vector (NAV) in surrounding communication apparatuses has also been defined.

However, in a case where data is transmitted by using a plurality of frequency channels, the presence of a conventional wireless LAN system causes a problem in which a use state needs to be grasped for each frequency channel having a bandwidth of 20 MHz.

In particular, setting of the network allocation vector (NAV) has caused a problem in which, in a case where a communication apparatus during reception is present near a local communication apparatus, transmission fails to be performed even when a signal has not been detected.

In conventional setting of a network allocation vector (NAV), the network allocation vector (NAV) is set during durations indicated by Durations in both an RTS frame and a CTS frame. Therefore, even if a communication apparatus that has transmitted an RTS frame has not detected the use of a transmission line, if a communication apparatus that will transmit a CTS frame has detected a signal or if the network allocation vector (NAV) has been set due to a signal from an adjacent basic service set (BSS), the CTS frame fails to be transmitted in response. This has caused a problem in which data fails to be transmitted or received.

Moreover, the network allocation vector (NAV) has been set in the surroundings due to transmission of an RTS frame from a communication apparatus serving as a transmission source. This has caused a problem in which another communication apparatus also fails to perform transmission during a duration indicated by Duration of the RTS frame although data is not transmitted or received.

In the configuration disclosed in Document A described above in which frequency channels are allocated by using a multiuser RTS, a data transmission channel has been allocated in advance to each terminal by an access point. If a network allocation vector (NAV) from a communication apparatus in an overlapping basic service set (BSS) has not been set on a terminal side, a CTS frame fails to be transmitted in response to the multiuser RTS, and moreover, data fails to be transmitted. This has caused a problem in which frequency channels fail to be effectively utilized.

Moreover, in a case where it is requested that an acknowledgment (ACK) frame be transmitted in response after data has been transmitted and in a case where a communication apparatus in another overlapping network is performing reception, there has been a problem in which transmission of the ACK frame collides with the reception.

The present technology solves the problems described above, and proposes a communication method (a new scheme) for performing communication by using an idle channel in accordance with a use state of a plurality of frequency channels.

Stated another way, in a communication method to which the present technology has been applied (a new scheme), a communication apparatus serving as a data transmission side (for example, a base station) generates a request signal (for example, a request frame such as an MCH_RTS frame) that includes information relating to transmittable frequency channels that have been selected from available frequency channels (hereinafter referred to as channel information), and information relating to a bandwidth (the number of frequency channels) of a frequency to be used in data transmission (hereinafter referred to as bandwidth information), and transmits the generated request signal to a communication apparatus on a reception side (for example, a terminal station).

On the other hand, a communication apparatus serving as a data reception side (for example, the terminal station) receives the request signal (for example, an MCH_RTS frame) to be transmitted from the communication apparatus on the transmission side (for example, the base station), selects a receivable frequency channel from the transmittable frequency channels on the basis of the channel information and the bandwidth information that are included in the received request signal, and transmits a response signal (for example, a response frame such as a CTS frame) to the communication apparatus on the transmission side (for example, the base station), by using the selected receivable frequency channel.

Then, the communication apparatus serving as the data transmission side (for example, the base station) receives the response signal (for example, the CTS frame) to be transmitted from the communication apparatus on the reception side (for example, the terminal station), and transmits data (for example, a data frame) to the communication apparatus on the reception side (for example, the terminal station), by using the frequency channel that the communication apparatus on the reception side (for example, the terminal station) has selected as a receivable frequency channel.

Note that, here, reception use is reported to surrounding communication apparatuses by transmitting a CTS frame used in a current scheme as a response frame (a response signal), and a network allocation vector (NAV) that corresponds to its reception duration is set. This enables data to be reliably received by using a corresponding channel.

Furthermore, in the communication method to which the present technology has been applied (the new scheme), a communication apparatus serving as a data transmission side (for example, a base station) transmits data (for example, a data frame) to a communication apparatus on a reception side (for example, a terminal station), by using a first frequency channel (for example, frequency channels f3 and f4). On the other hand, the communication apparatus on the data reception side (for example, the terminal station)

receives the data (for example, the data frame) to be transmitted from the communication apparatus on the transmission side (for example, the base station), by using the first frequency channel (for example, frequency channels f3 and f4).

Next, the communication apparatus serving as the data transmission side (for example, the base station) generates a request signal (for example, a request frame such as a BAR frame) that is a signal requesting acknowledgment (for example, an ACK frame) of normal reception of the data (for example, the data frame) and includes information (channel information) relating to transmittable frequency channels (for example, frequency channels that enable the communication apparatus on the reception side (for example, the terminal station) to transmit an acknowledgment signal (for example, the ACK frame)) that have been selected from available frequency channels, and transmits the generated request signal (for example, the BAR frame) by using a second frequency channel (for example, frequency channel f1 that is different from frequency channels f3 and f4).

On the other hand, in a case where the request signal (for example, the BAR frame) to be transmitted from the communication apparatus on the transmission side (for example, the base station) has been received by using the second frequency channel (for example, frequency channel f1) and the data (for example, the data frame) has been received normally, the communication apparatus serving as the data reception side (for example, the terminal station) selects a frequency channel from the transmittable frequency channels on the basis of the channel information included in the received request signal, and transmits the acknowledgment signal (for example, the ACK frame) to the communication apparatus on the transmission side (for example, the base station) by using the selected frequency channel.

Note that, here, a block ack request (BAR) frame is used as a request frame (a request signal), and an ACK frame used in a current scheme is used as a frame that responds to this, and therefore the ACK frame can be reliably transmitted in response.

Details of the communication method to which the present technology has been applied (the new scheme) are described below.

(Example of Configuration of Wireless Network)

FIG. 1 is a diagram illustrating an example of a configuration of a wireless network.

In FIG. 1, a wireless network of a basic service set BSS includes base station AP10, terminal station STA11, and terminal station STA12. Moreover, a wireless network of a basic service set OBSS that is adjacent to this and overlaps this includes base station AP20, terminal station STA21, and terminal station STA22.

FIG. 1 illustrates a configuration in which terminal station STA12 of the basic service set BSS and terminal station STA21 of the basic service set OBSS are located in positions where a signal can be mutually received (dotted arrow A1 in the drawing), and signal transmission performed by these terminal stations STA causes interference in reception performed by a counterpart terminal station STA.

(Example of Current Access Control)

Figure 2:
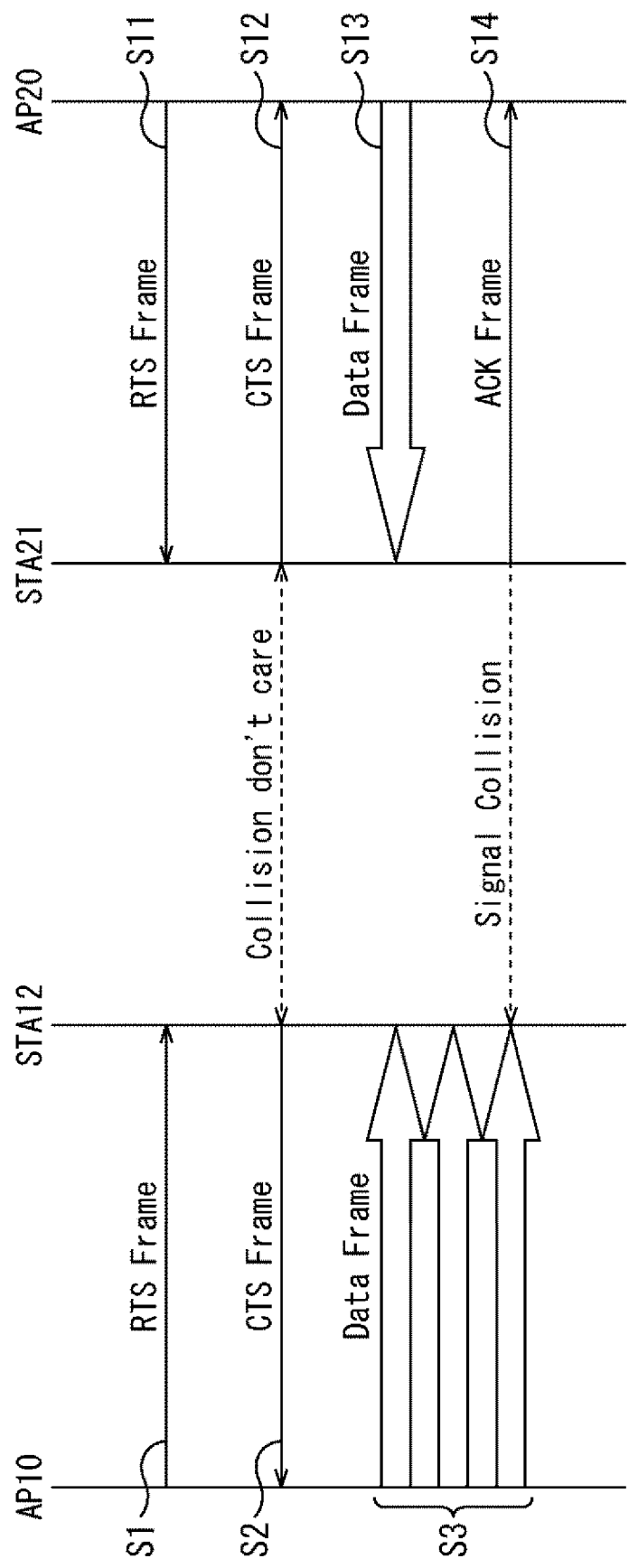
FIG. 2 is a diagram illustrating an example of access control of a wireless network according to a current scheme.

FIG. 2 is a diagram illustrating an example of access control of a wireless network according to a current scheme under the assumption of the configuration of the wireless network illustrated in FIG. 1.

FIG. 2 illustrates an access control sequence of exchange between base station AP10 and terminal station STA12 of the basic service set BSS and between terminal station STA21 and base station AP20 of the basic service set OBSS, and illustrates a configuration in which radio waves of adjacent terminal stations STAs reach.

Stated another way, this drawing illustrates a sequence of exchanging an RTS frame and a CTS frame prior to data transmission using the same frequency channel, performing data communication using a data frame, and then transmitting an ACK frame in response.

Specifically, an RTS frame is transmitted from each of the base station AP10 of the basic service set BSS and base station AP20 of the basic service set OBSS (S1 and S11), and each of the terminal station STA12 and terminal station STA21 responds to this RTS frame with a CTS frame (S2 and S12).

Then, data communication is performed between base station AP10 and terminal station STA12 and between base station AP20 and terminal station STA21 (S3 and S13). However, in a case where there is a difference in a data transmission time, a timing of transmitting an ACK frame in response changes. Therefore, terminal station STA21 transmits an ACK frame in response, while terminal station STA12 is receiving data (S14).

Therefore, a collision between signals occurs, and terminal station STA12 fails to receive data from base station AP10.

(Example of Access Control of the Present Technology)

Figure 3:
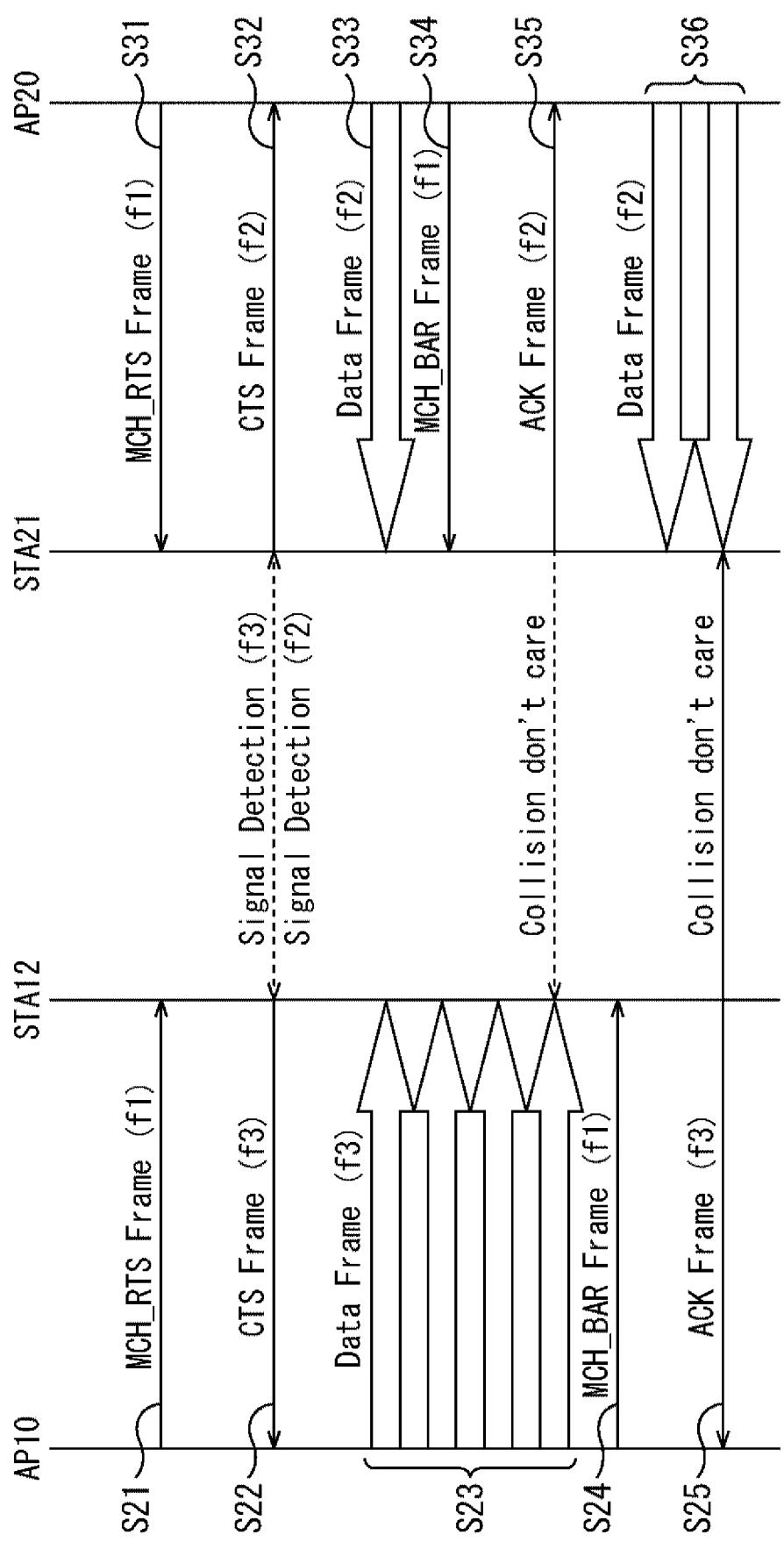
FIG. 3 is a diagram illustrating an example of access control of a wireless network according to a new scheme.

FIG. 3 is a diagram illustrating an example of access control of a wireless network according to the new scheme under the assumption of the configuration of the wireless network illustrated in FIG. 1.

Similarly to FIG. 2, FIG. 3 illustrates an access control sequence of exchange between base station AP10 and terminal station STA12 of the basic service set BSS and between terminal station STA21 and base station AP20 of the basic service set OBSS, and illustrates a configuration in which radio waves of adjacent terminal stations STAs reach.

Here, an MCH_RTS frame is transmitted from each of the base station AP10 of the basic service set BSS and base station AP20 of the basic service set OBSS by using the same frequency channel (f1) (S21 and S31).

Each of terminal station STA12 and terminal station STA21 that have received these MCH_RTS frames selects an available frequency channel, and responds with a CTS frame. At this time, terminal station STA12 transmits the CTS frame in response by using a frequency channel (f3) (S22). On the other hand, terminal station STA21 transmits the CTS frame in response by using a frequency channel (f2) (S32).

Accordingly, base station AP10 and base station AP20 receive the CTS frame by using frequency channels (f3 and f2) that are different from each other. Then, base station AP10 transmits a data frame by using the frequency channel (f3) (S23). On the other hand, base station AP20 transmits a data frame by using the frequency channel (f2) (S33). Note that, here, it is also assumed that there is a difference in a data transmission time.

Thereafter, when a timing of transmitting an ACK frame from terminal station STA21 to base station AP20 in response has arrived, different frequency channels (f3 and f2) are used in this case. Therefore, the ACK frame can be exchanged without an influence on reception performed by terminal station STA12.

Stated another way, an MCH_BAR frame is transmitted from base station AP20 to terminal station STA21 by using a predetermined frequency channel (f1) (S34). At this time, terminal station STA21 has detected the CTS frame of the frequency channel (f3). Therefore, terminal station STA21 selects a frequency channel (f2) that is different from the frequency channel (f3), and transmits an ACK frame in response by using the selected frequency channel (f2) (S35). At this time, a data frame is being transmitted from base station AP10 to terminal station STA12 (S23). However, the frequency channel (f3) is used to transmit the data frame, and therefore a collision between signals does not occur.

As described above, in access control of a wireless network according to the present technology, at least channel information relating to an available frequency channel is described in a request frame (for example, an MCH_RTS frame or an MCH_BAR frame) to be transmitted from a base station AP, and a response frame (for example, a CTS frame or an ACK frame) to be transmitted from a terminal station STA is transmitted in response by using a frequency channel to be used. This avoids the occurrence of interference in another terminal station STA of an overlapping network.

In FIG. 3, thereafter, an MCH_BAR frame is transmitted from base station AP10 to terminal station STA12 by using a predetermined frequency channel (f1) (S24). Terminal station STA12 selects a frequency channel (f3) that is different from the frequency channel (f2), and transmits an ACK frame in response by using the selected frequency channel (f3) (S25). At this time, a data frame is being transmitted from base station AP20 to terminal station STA21 (S36). However, the frequency channel (f2) is used to transmit the data frame, and therefore a collision between signals does not occur.

(Example of Arrangement of Frequency Channels)

Figure 4:
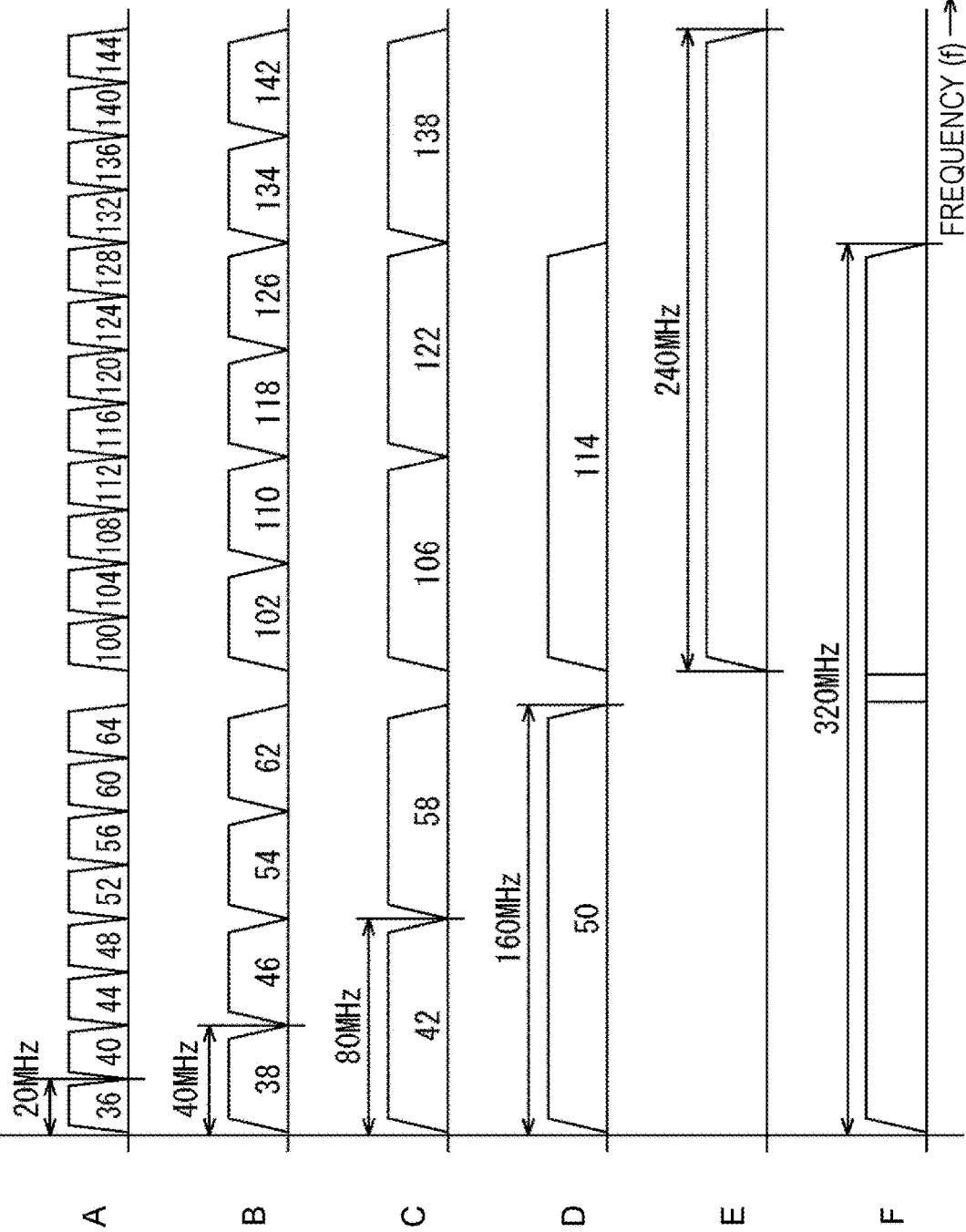
FIG. 4 is a diagram illustrating an example of arrangement of available frequency channels in a wireless LAN system.

FIG. 4 is a diagram illustrating an example of arrangement of available frequency channels in a wireless LAN system.

FIG. 4 illustrates, for example, channel arrangement in the 5 GHz band serving as a currently available frequency band. As illustrated in A of FIG. 4, that is, an uppermost section, channels 36, 40, 44, 48, 52, 56, 60, and 64 are arranged in accordance with a center frequency in units of 20 MHz in an ascending order of frequency. Moreover, for a higher frequency, channels 100, 104, 108, 112, 116, 120, 124, 128, 132, 136, 140, and 144 are arranged in units of 20 MHz.

Note that a regulated available frequency band changes among various countries, and therefore respective ranges of these available frequency channels change in some cases.

B (a second section) of FIG. 4 illustrates a configuration in a case where frequency channels are used in units of 40 MHz. According to a center frequency, channels 38, 46, 54, and 62 are arranged for a lower frequency, and channels 102, 110, 118, 126, 134, and 142 are arranged for a higher frequency.

C (a third section) of FIG. 4 illustrates a configuration in a case where frequency channels are used in units of 80 MHz. According to a center frequency, channels 42 and 58 are arranged for a lower frequency, and channels 106, 122, and 138 are arranged for a higher frequency.

D (a fourth section) of FIG. 4 illustrates a configuration in a case where frequency channels are used in units of 160 MHz. According to a center frequency, channel 50 is arranged for a lower frequency, and channel 114 is arranged for a higher frequency.

Furthermore, E (a fifth section) of FIGS. 4 and F (a sixth section) of FIG. 4 illustrate configurations in a case where a bundle of even more frequency channels is used, and respectively illustrate a case where a channel that covers the entirety of 240 MHz for a higher frequency is used, and a case where a channel of 320 MHz that covers both a lower frequency and a higher frequency is used.

(Example of Access Control Procedure of the Present Technology)

Figure 5:
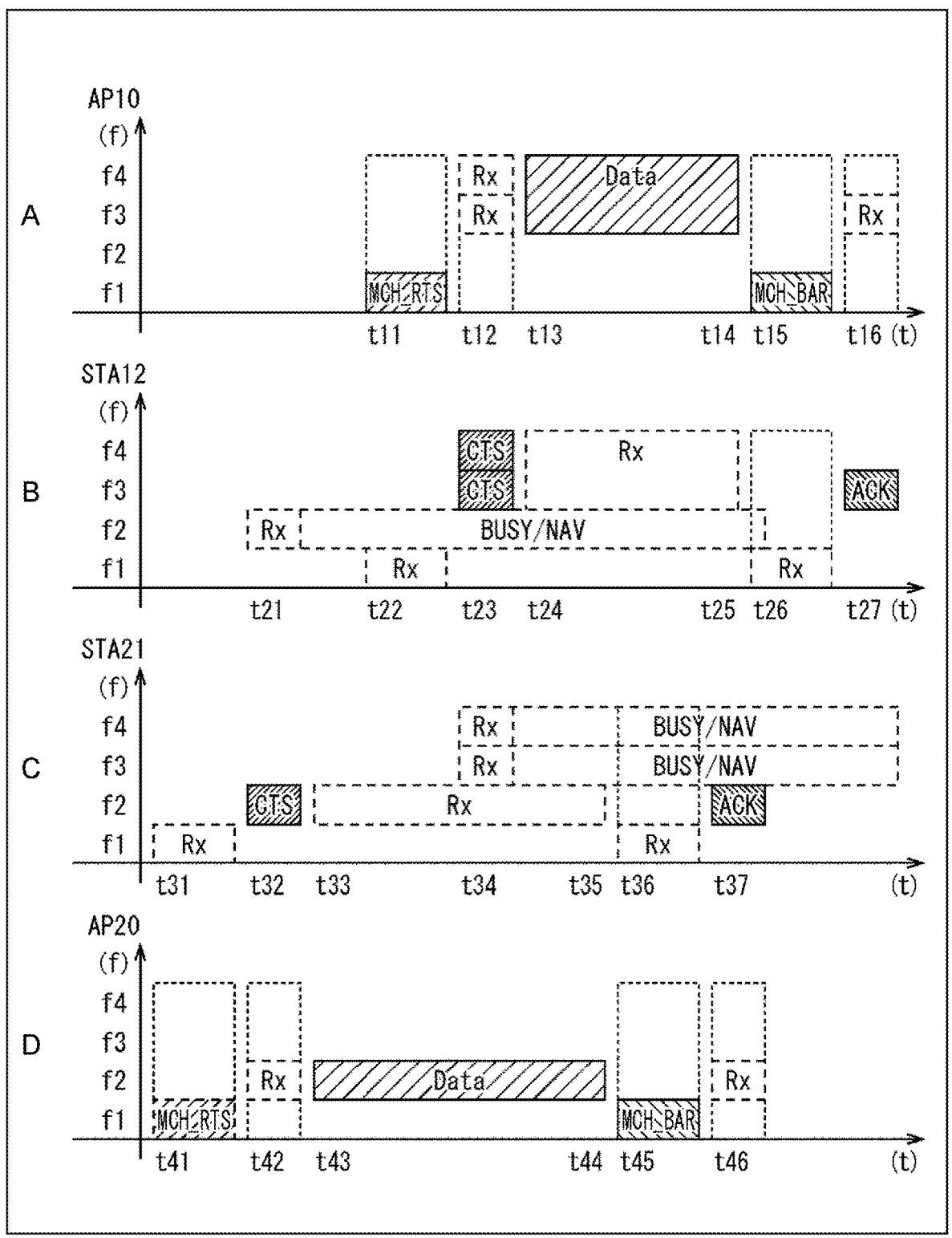
FIG. 5 is a diagram illustrating an example of a multichannel access control procedure according to the new scheme.

FIG. 5 is a diagram illustrating an example of a multichannel access control procedure according to the new scheme.

FIG. 5 illustrates a procedure of performing multichannel access control by using four frequency channels f1 to f4, for convenience of description. However, the number of frequency channels is an example, and access control may be performed by using three or less frequency channels or five or more frequency channels.

In A of FIG. 5, that is, a first section in the drawing, as an operation of base station AP10, a vertical axis indicates a frequency channel (f), and a horizontal axis indicates time (t).

In A of FIG. 5, at time t11, in a case where base station AP10 has determined that frequency channels f1 to f4 that are not used in the surroundings are available for transmission performed by base station AP10 itself, base station AP10 transmits an MCH_RTS frame ("MCH_RTS" in A of FIG. 5) that includes channel information and bandwidth information to terminal station STA12 serving as a reception destination (a reception side), by using a frequency channel f1 that has been predetermined. For example, this MCH_RTS frame describes frequency channels f1 to f4 as the channel information, and describes two channels (for example, 40 MHz or the like) as the bandwidth information.

Moreover, at time t12, base station AP10 enters into a standby state for receiving a response frame (a CTS frame) in response to the MCH_RTS frame serving as a request frame by using frequency channels f1 to f4 that have been determined to be available for transmission performed by base station AP10 itself. In this example, base station AP10 receives the CTS frame ("Rx" in A of FIG. 5 that corresponds to "CTS" in B of FIG. 5) from terminal station STA12 serving as the reception destination, by using frequency channels f3 and f4. Therefore, during a period from time t13 to time t14, base station AP10 transmits a data frame ("Data" in A of FIG. 5) to terminal station STA12 by using frequency channels f3 and f4.

Furthermore, at time t15, in a case where base station AP10 has determined that frequency channels f1 to f4 that are not used in the surroundings are available for transmission performed by base station AP10 itself, base station AP10 transmits an MCH_BAR frame ("MCH_BAR" in A of FIG. 5) that includes channel information to terminal station STA12 that has served as a reception destination of the data frame, by using a frequency channel f1 that has been predetermined. For example, this MCH_BAR frame describes frequency channels f1 to f4 as the channel information.

However, a frequency channel (f3 or f4) to be used in transmission of the data frame is different from a frequency channel (f1) to be used in transmission of the MCH_BAR frame.

Then, at time t16, base station AP10 enters into a standby state for receiving a response frame (an ACK frame) in response to the MCH_BAR frame serving as a request frame by using frequency channels f1 to f4 that have been determined to be available for transmission performed by base station AP10 itself. In this example, base station AP10 receives the ACK frame ("Rx" in A of FIG. 5 that corresponds to "ACK" in B of FIG. 5) from terminal station STA12 serving as the reception destination, by using a frequency channel f3.

In B (a second section) of FIG. 5, as an operation of terminal station STA12, a vertical axis indicates a frequency channel (f), and a horizontal axis indicates time (t). Note that the horizontal axis in B (the second section) of FIG. 5 also corresponds to time series of the horizontal axis in A (the first section) of FIG. 5, and time t22 to time t27 in B of FIG. 5 respectively correspond to time t11 to time t16 in A of FIG. 5.

In B of FIG. 5, in a case where terminal station STA12 has received a CTS frame ("Rx" in B of FIG. 5 that corresponds to "CTS" in C of FIG. 5) from terminal station STA21 that is present in the surroundings by using a frequency channel f2 at time t21, terminal station STA12 sets, for frequency channel f2, a network allocation vector ("BUSY/NAV" in B of FIG. 5) until a duration of data reception that follows.

Moreover, at time t22, terminal station STA12 receives an MCH_RTS frame ("Rx" in B of FIG. 5 that corresponds to "MCH_RTS" in A of FIG. 5) that is addressed to terminal station STA12 itself from base station AP10, by using a frequency channel f1 that has been predetermined. For example, this MCH_RTS frame describes frequency channels f1 to f4 as the channel information, and describes two channels (for example, 40 MHz or the like) as the bandwidth information.

The network allocation vector (NAV) has been set for frequency channel f2 from among frequency channels f1 to f4 described in the channel information included in the MCH_RTS frame. Therefore, terminal station STA12 selects, as a frequency channel to be used, two channels (for example, 20 MHz×2=40 MHz), frequency channels f3 and f4 that are different from frequency channel f2. Here, a plurality of channels (multiple channels) is selected in contrast to a single channel, and this enables, for example, a reduction in a reception time (a transmission time) of a data frame.

Then, at time t23, terminal station STA12 transmits a CTS frame ("CTS" in B of FIG. 5) to base station AP10, by using frequency channels f3 and f4 that have been selected. Accordingly, during a period from time t24 to time t25, terminal station STA12 receives a data frame ("Rx" in B of FIG. 5 that corresponds to "Data" in A of FIG. 5) from base station AP10, by using frequency channels f3 and f4.

Furthermore, at time t26 after reception of the data frame, terminal station STA12 enters into a standby state for reception by using frequency channels f1 to f4 that have been previously specified by base station AP10 to be available. In this example, terminal station STA12 receives the MCH_BAR frame ("Rx" in B of FIG. 5 that corresponds to "MCH_BAR" in A of FIG. 5) from base station AP10, by using a frequency channel f1 that has been predetermined. For example, this MCH_BAR frame describes frequency channels f1 to f4 as the channel information.

Here, similarly, the network allocation vector (NAV) has been set for frequency channel f2, or the ACK frame is being received from terminal station STA21. Therefore, terminal station STA12 selects frequency channel f3 that is different from frequency channel f2, from among frequency channels f1 to f4. Then, at time t27, terminal station STA12 transmits an ACK frame ("ACK" in B of FIG. 5) to base station AP10, by using a frequency channel f3 that has been selected.

In C (a third section) of FIG. 5, as an operation of terminal station STA21, a vertical axis indicates a frequency channel (f), and a horizontal axis indicates time (t). Note that the horizontal axis in C (the third section) of FIG. 5 also corresponds to time series of the horizontal axis in B (the second section) of FIG. 5, time t32 in C of FIG. 5 corresponds to time t21 in B of FIG. 5, and time t34 in C of FIG. 5 corresponds to time t23 in B of FIG. 5.

In C of FIG. 5, at time t31, terminal station STA21 receives an MCH_RTS frame ("Rx" in C of FIG. 5 that corresponds to "MCH_RTS" in D of FIG. 5) that is addressed to terminal station STA21 itself from base station AP20, by using a frequency channel f1 that has been predetermined. For example, this MCH_RTS frame describes frequency channels f1 to f4 as the channel information, and describes one channel (for example, 20 MHz or the like) as the bandwidth information.

Here, frequency channels f1 to f4 described in the channel information included in the MCH_RTS frame do not include a frequency channel that is being used in the surroundings. Therefore, terminal station STA21 selects one channel (for example, 20 MHz), frequency channel f2.

Then, at time t32, terminal station STA21 transmits a CTS frame ("CTS" in C of FIG. 5) to base station AP20, by using a frequency channel f2 that has been selected. Therefore, during a period from time t33 to time t35, terminal station STA21 receives a data frame ("Rx" in C of FIG. 5 that corresponds to "Data" in D of FIG. 5) from base station AP20, by using a frequency channel f2.

However, here, terminal station STA21 enters into a standby state for reception by using frequency channels f1 to f4 that have been specified by base station AP20 to be available. In this example, in a case where terminal station STA21 has received the CTS frame ("Rx" in C of FIG. 5 that corresponds to "CTS" in B of FIG. 5) from terminal station STA12 that is present in the surroundings by using frequency channels f3 and f4 at time t34, terminal station STA21 sets, for frequency channels f3 and f4, a network allocation vector ("BUSY/NAV" in C of FIG. 5) until a duration of data reception that follows.

Then, at time t36 after reception of the data frame, terminal station STA21 enters into a standby state for reception by using frequency channels f1 to f4 that have been previously specified by base station AP20 to be available. In this example, an MCH_BAR frame ("Rx" in C of FIG. 5 that corresponds to "MCH_BAR" in D of FIG. 5) is received from base station AP20 by using a frequency channel f1 that has been predetermined. For example, this MCH_BAR frame describes frequency channels f1 to f4 as the channel information.

Here, the network allocation vector (NAV) has been set for frequency channels f3 and f4. Therefore, terminal station STA21 selects frequency channel f2 that is different from frequency channels f3 and f4, from among frequency channels f1 to f4. Then, at time t37, terminal station STA21 transmits an ACK frame ("ACK" in C of FIG. 5) to base station AP20, by using a frequency channel f2 that has been selected.

In D (a fourth section) of FIG. 5, as an operation of base station AP20, a vertical axis indicates a frequency channel (f), and a horizontal axis indicates time (t). Note that the horizontal axis in D of FIG. 5 also corresponds to time series of the horizontal axis in C (the third section) of FIG. 5, and time t41 to time t46 in D of FIG. 5 respectively correspond to time t31 to time t37 (excluding time t34) in C of FIG. 5.

In D of FIG. 5, at time t41, in a case where base station AP20 has determined that frequency channels f1 to f4 that are not used in the surroundings are available for transmission performed by base station AP20 itself, base station AP20 transmits an MCH_RTS frame ("MCH_RTS" in D of FIG. 5) that includes channel information and bandwidth information to terminal station STA21 serving as a reception destination (a reception side), by using a frequency channel f1 that has been predetermined. For example, this MCH_RTS frame describes frequency channels f1 to f4 as the channel information, and describes one channel (for example, 20 MHz or the like) as the bandwidth information.

Moreover, at time t42, base station AP20 enters into a standby state for receiving a CTS frame in response to the MCH_RTS frame by using frequency channels f1 to f4 that have been determined to be available for transmission performed by base station AP20 itself. In this example, base station AP20 receives the CTS frame ("Rx" in D of FIG. 5 that corresponds to "CTS" in C of FIG. 5) from terminal station STA21 serving as the reception destination, by using a frequency channel f2. Therefore, during a period from time t43 to time t44, base station AP20 transmits a data frame ("Data" in D of FIG. 5) to terminal station STA21 by using a frequency channel f2.

Furthermore, at time t45, in a case where base station AP20 has determined that frequency channels f1 to f4 that are not used in the surroundings are available for transmission performed by base station AP20 itself, base station AP20 transmits an MCH_BAR frame ("MCH_BAR" in D of FIG. 5) that includes channel information to terminal station STA21 that has served as a reception destination of the data frame, by using a frequency channel f1 that has been predetermined. For example, this MCH_BAR frame describes frequency channels f1 to f4 as the channel information.

However, a frequency channel (f2) to be used in transmission of the data frame is different from a frequency channel (f1) to be used in transmission of the MCH_BAR frame.

Then, at time t46, base station AP20 enters into a standby state for receiving an ACK frame in response to the MCH_BAR frame by using frequency channels f1 to f4 that have been determined to be available for transmission performed by base station AP20 itself. In this example, base station AP20 receives the ACK frame ("Rx" in D of FIG. 5 that corresponds to "ACK" in C of FIG. 5) from terminal station STA21 serving as the reception destination, by using a frequency channel f2.

As described above, in multichannel access control according to the present technology, in transmitting a data frame from a base station AP to a terminal station STA, an MCH_RTS frame including channel information and bandwidth information is transmitted. This enables the data frame to be transmitted or received by using an idle channel (f3 and f4, f2, or the like) according to a use state of a plurality of frequency channels (f1 to f4, or the like). Furthermore, in receiving an ACK frame from a terminal station STA, a base station AP transmits an MCH_BAR frame including channel information. This enables the ACK frame to be transmitted or received by using an idle channel (f3, f2, or the like) according to a use state of a plurality of frequency channels (f1 to f4, or the like).

(Example of Configuration of Data Frame)

FIG. 6 is a diagram illustrating an example of a configuration of a data frame.

The frame configuration illustrated in FIG. 6 is called a MAC protocol data unit (MPDU), and is transmitted after a preamble signal of a PHY layer.

In FIG. 6, the data frame includes Frame Control, Duration, Address 1 to Address 4, Sequence Control, QoS Control, HT Control, Frame Body, and FCS.

Frame Control describes frame control information or the type of the frame. Duration describes a duration of the frame. Address 1 to Address 4 describe address information that identifies a transmission source or a reception destination.

Sequence Control describes sequence number information for performing sequence control on the frame. QoS Control describes a parameter of QoS control performed on the frame. HT Control describes a parameter for high-throughput control.

These pieces of information are added as a MAC header to data to be actually transmitted. In the data frame, a data portion to be actually transmitted in contrast to the MAC header is configured as Frame Body, and a frame check sequence (FCS) for error detection is further added at the end.

(Example of Configuration of MCH_RTS Frame)

FIG. 7 is a diagram illustrating an example of a configuration of a multichannel RTS frame (an MCH_RTS frame) to which the present technology has been applied.

In FIG. 7, the MCH_RTS frame includes Frame Control, Duration, Transmit Address, Receive Address, Available Channel Map, Requirement Bandwidth, and FCS.

Stated another way, in the MCH_RTS frame, (parameters of) Available Channel Map and Requirement Bandwidth are newly added, in addition to Duration describing a duration of transmission, Transmit Address (TA) describing a transmission address, Receive Address (RA) describing a reception address, and FCS at the end of a frame that are included in a current RTS frame.

Available Channel Map describes channel information relating to a transmittable frequency channel, that is, a frequency channel that enables a communication apparatus on a transmission side (for example, a base station AP) to transmit data (for example, a data frame), that has been selected from available frequency channels. For example, FIG. 8 illustrates an example in a case where Available Channel Map is expressed in a bitmap format.

In FIG. 8, respective bits in a bitmap of 32 bits are expressed by numerical characters of 0 to 31. Here, bit 0 at the top is expressed as channel 36, bit 1 that follows is expressed as channel 40, . . . , bit 31 at the end is expressed as channel 160, and an available frequency channel is allocated to each of the bits. For example, in Available Channel Map, from among available frequency channels expressed by bits 0 to 31, bits that correspond to a transmittable frequency channel can be set to "1", and the other bits can be set to "0".

Note that, here, the channel information is expressed in a bitmap format, but such a format is not restrictive. The channel information may employ another format as long as a channel number can be specified.

Requirement Bandwidth describes bandwidth information relating to a bandwidth of a frequency (the number of frequency channels) that is used to transmit data. For example, FIG. 9 illustrates, as Requirement Bandwidth, an example in a case where a bandwidth of a frequency to be used is expressed in association with a numerical value.

In FIG. 9, a numerical value is associated with a bandwidth of a frequency to be used to transmit data. Therefore, for example, the numerical number 0 is associated with a bandwidth of 20 MHz, the numerical number 1 is associated with a bandwidth of 40 MHz, . . . . As described above, as the numerical value increases, the bandwidth also increases, and the numerical number 15 can specify a bandwidth (the number of channels) that uses a bandwidth of 320 MHz. Note that, for example, if a frequency channel is allocated in units of 20 MHz, for example, a bandwidth of 20 MHz corresponds to a number of channels of 1. Furthermore, for example, a bandwidth of 40 MHz corresponds to a number of channels of 2.

(Example of Configuration of CTS Frame)

FIG. 10 is a diagram illustrating an example of a configuration of a CTS frame.

In FIG. 10, the CTS frame includes Frame Control, Duration, Receive Address, and FCS.

Stated another way, the CTS frame includes Duration describing a duration of transmission, Receive Address (RA) describing a reception address, and FCS at the end of the frame, similarly to a current CTS frame. As described above, the CTS frame has a configuration that is similar to a configuration of the current CTS frame, and therefore compatibility can be kept with a wireless LAN system according to a current scheme.

(Example of Configuration of MCH_BAR Frame)

FIG. 11 is a diagram illustrating an example of a configuration of a multichannel BAR frame (an MCH_BAR frame) to which the present technology has been applied.

In FIG. 11, the MCH_BAR frame includes Frame Control, Duration, Transmit Address, Receive Address, Available Channel Map, BA Control, BA Information, and FCS.

Stated another way, in the MCH_BAR frame, (a parameter of) Available Channel Map is newly added, in addition to Duration describing a duration of transmission, Transmit Address (TA) describing a transmission address, Receive Address (RA) describing a reception address, BA Control describing control information of block ACK, BA Information describing information relating to required block ACK, and FCS at the end of a frame that are included in a current BAR frame.

Available Channel Map describes channel information relating to a transmittable frequency channel, that is, a frequency channel that enables a communication apparatus on a reception side (for example, a terminal station STA) to transmit an acknowledgment signal (for example, an ACK frame), that has been selected from available frequency channels, similarly to, for example, the information in a bitmap format illustrated in FIG. 8, and the like. In other words, it can also be said that the channel information is a frequency channel that enables a communication apparatus on a transmission side (for example, a base station AP) to transmit a request signal (for example, an MCH_BAR frame).

Note that information of an ACK frame to be transmitted in response (ACK information) is short information (information having a small amount of data) in contrast to data, and therefore a parameter of Requirement Bandwidth can be omitted from the MCH_BAR frame in comparison with a configuration of the MCH_RTS frame.

(Example of Configuration of Block ACK Frame)

FIG. 12 is a diagram illustrating an example of a configuration of a block ACK frame.

In FIG. 12, the block ACK frame includes Frame Control, Duration, Transmit Address, Receive Address, BA Control, BA Information, and FCS.

Stated another way, the block ACK frame includes Duration describing a duration of transmission, Transmit Address (TA) describing a transmission address, Receive Address (RA) describing a reception address, BA Control describing control information of block ACK, BA Information describing information relating to required block ACK, and FCS at the end of the frame, similarly to a current block ACK frame. As described above, the block ACK frame has a configuration that is similar to a configuration of the current block ACK frame, and therefore compatibility can be kept with a wireless LAN system according to a current scheme.

(Example of Configuration of Communication Apparatus)

Figure 13:
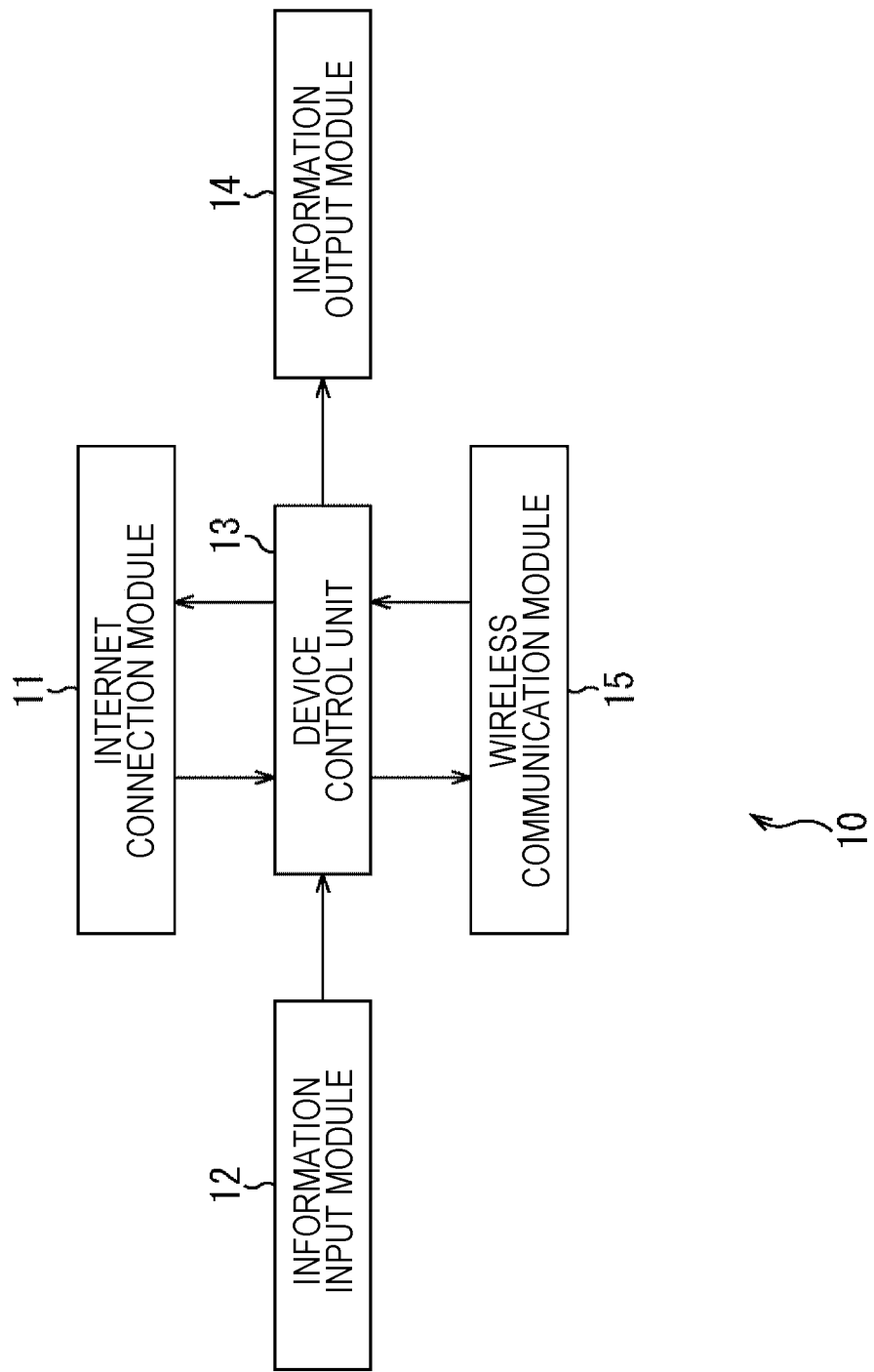
FIG. 13 is a block diagram illustrating an example of a configuration of a communication apparatus to which the present technology has been applied.

FIG. 13 is a block diagram illustrating an example of a configuration of a communication apparatus (a wireless communication apparatus) to which the present technology has been applied. A communication apparatus 10 illustrated in FIG. 13 is configured as a base station AP or a terminal station STA in a wireless network (FIG. 1).

In FIG. 13, the communication apparatus 10 includes an Internet connection module 11, an information input module 12, a device control unit 13, an information output module 14, and a wireless communication module 15.

The Internet connection module 11 includes, for example, a circuit that has, as a base station AP, a function of establishing connection from an optical fiber network or another communication line via a service provider to the Internet network, its peripheral circuit, a microcontroller, a semiconductor memory, or the like. The Internet connection module 11 performs processing relating to Internet connection under the control of the device control unit 13. For example, in a case where the communication apparatus 10 operates as a base station AP, a function of a communication modem or the like for establishing connection to the Internet network is implemented in the Internet connection module 11.

The information input module 12 includes, for example, an input device such as a push button, a keyboard, or a touch panel. The information input module 12 has a function of inputting, to the device control unit 13, instruction information that corresponds to an instruction from a user.

The device control unit 13 includes, for example, a microprocessor, a microcontroller, or the like. The device control unit 13 controls each unit (each module) in order to cause the communication apparatus 10 to operate as a base station AP or a terminal station STA.

The device control unit 13 performs processing on information that has been supplied from the Internet connection module 11, the information input module 12, or the wireless communication module 15. Furthermore, the device control unit 13 supplies information obtained as a result of processing performed by the device control unit 13 itself to the Internet connection module 11, the information output module 14, or the wireless communication module 15.

For example, the device control unit 13 supplies, to the wireless communication module 15, transmission data transferred from an application in a protocol upper layer, or the like, when data is transmitted, or transfers, to the application in the protocol upper layer, or the like, reception data supplied from the wireless communication module 15, when data is received.

The information output module 14 includes, for example, an output device including a display element, such as a liquid crystal display (LCD), an organic EL display (organic light emitting diode (OLED)), or a light emitting diode (LED) display.

The information output module 14 has a function of displaying required information to a user on the basis of information supplied from the device control unit 13. Here, information to be processed by the information output module 14 includes, for example, an operation state of the communication apparatus 10, information obtained via the Internet network, and the like.

The wireless communication module 15 includes, for example, a wireless chip, a peripheral circuit, a microcontroller, a semiconductor memory, or the like. The wireless communication module 15 performs processing relating to wireless connection under the control of the device control unit 13. Details of a configuration of the wireless communication module 15 will be described later with reference to FIG. 14.

Note that, here, description is provided by using, as an example, a wireless communication module on which a wireless communication chip, a peripheral circuit, or the like is mounted. However, the present technology is not limited to the wireless communication module, and can be applied, for example, to the wireless communication chip, a wireless communication LSI, or the like. Moreover, it is optional whether or not the wireless communication module includes an antenna.

Furthermore, in the communication apparatus 10 of FIG. 13, the device control unit 13 and the wireless communication module 15 are essential components. However, it is optional whether or not components include the Internet connection module 11, the information input module 12, and the information output module 14 excluding the device control unit 13 and the wireless communication module 15.

Stated another way, each communication apparatus 10 that operates as a base station AP or a terminal station STA can only include required modules, and can have a configuration in which an unnecessary portion is simplified or is not incorporated. More specifically, for example, the Internet connection module 11 can only be incorporated into a base station AP, and the information input module 12 or the information output module 14 can only be incorporated into a terminal station STA.

Example of Configuration of Wireless Communication Module

Figure 14:
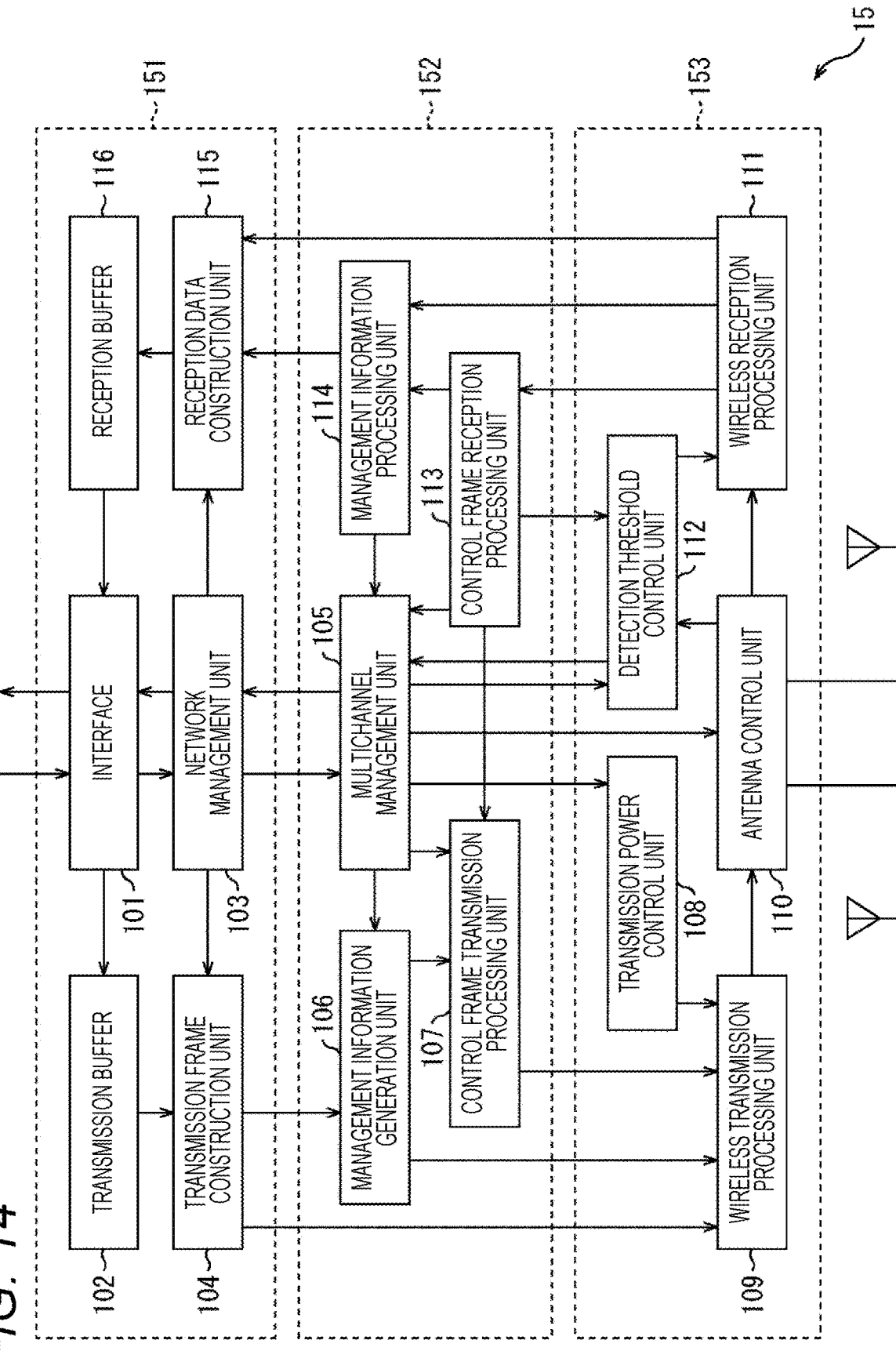
FIG. 14 is a block diagram illustrating an example of a configuration of a wireless communication module.

FIG. 14 is a block diagram illustrating an example of a configuration of the wireless communication module 15 of FIG. 13.

In FIG. 14, the wireless communication module 15 includes an interface 101, a transmission buffer 102, a network management unit 103, a transmission frame construction unit 104, a multichannel management unit 105, a management information generation unit 106, a control frame transmission processing unit 107, a transmission power control unit 108, a wireless transmission processing unit 109, an antenna control unit 110, a wireless reception processing unit 111, a detection threshold control unit 112, a control frame reception processing unit 113, a management information processing unit 114, a reception data construction unit 115, and a reception buffer 116.

The interface 101 includes, for example, an input/output interface circuit or the like. The interface 101 is an interface for communicating data with the device control unit 13 (FIG. 13), and has a function of exchanging information input to the interface 101 or information output from the interface 101 in a predetermined signal format.

The interface 101 writes, to the transmission buffer 102, transmission data input from the device control unit 13. Furthermore, the interface 101 supplies the network management unit 103 with information input from the device control unit 13, or outputs, to the device control unit 13, information supplied from the network management unit 103.

The transmission buffer 102 includes, for example, a semiconductor memory device such as a buffer memory. The transmission buffer 102 transitorily stores transmission data written via the interface 101.

The network management unit 103 manages address information or the like of the communication apparatus 10 in a wireless network. Furthermore, the network management unit 103 is configured to establish connection to an Internet network in a case where the communication apparatus 10 operates as a base station AP.

The transmission frame construction unit 104 reads the transmission data stored in the transmission buffer 102, constructs the transmission data as a data frame to be transmitted through wireless communication, and supplies the data frame to the wireless transmission processing unit 109. Furthermore, the transmission frame construction unit 104 supplies transmission frame information relating to a transmission frame to the management information generation unit 106.

The multichannel management unit 105 has a multichannel management function for individually managing a use state of a plurality of frequency channels. Furthermore, the multichannel management unit 105 has a function of monitoring a state of an available frequency channel described in a request frame (a request signal) or a response frame (a response signal) and immediately grasping an available channel.

The multichannel management unit 105 performs processing on information supplied from the network management unit 103, the detection threshold control unit 112, the control frame reception processing unit 113, or the management information processing unit 114. Furthermore, the multichannel management unit 105 supplies information (multichannel management information) obtained as a result of processing performed by the multichannel management unit 105 itself to the network management unit 103, the management information generation unit 106, the control frame transmission processing unit 107, the transmission power control unit 108, the antenna control unit 110, or the detection threshold control unit 112.

The management information generation unit 106 is supplied with the transmission frame information from the transmission frame construction unit 104 and the multichannel management information from the multichannel management unit 105. The management information generation unit 106 generates management information on the basis of the transmission frame information and the multichannel management information, and supplies the management information to the control frame transmission processing unit 107 and the wireless transmission processing unit 109.

This management information includes, for example, header information or various parameters of a frame to be actually transmitted through wireless communication. For example, various parameters (for example, Available Channel Map, Requirement Bandwidth, or the like) of a multi-control frame such as an MCH_RTS frame or an MCH_BAR frame are also generated here, and are supplied to the control frame transmission processing unit 107.

The control frame transmission processing unit 107 is supplied with the multichannel management information from the multichannel management unit 105, the management information from the management information generation unit 106, and control frame reception information from the control frame reception processing unit 113. The control frame transmission processing unit 107 controls the wireless transmission processing unit 109 on the basis of the multichannel management information, the management information, and the control frame reception information to perform processing for transmitting a control frame (including a multi-control frame).

In this transmission processing, a function of unitarily controlling processing in a case where a multi-control frame, such as an MCH_RTS frame or an MCH_BAR frame, is transmitted has been added, in addition to processing in a case where a current control frame, such as a CTS frame or an ACK frame, is transmitted.

The transmission power control unit 108 controls transmission power in such a way that a signal does not reach an unnecessary radio-wave reaching range in a case where a predetermined frame is transmitted to the wireless transmission processing unit 109. Here, a function of adjusting minimum necessary transmission power on the basis of the multichannel management information from the multichannel management unit 105 in such a way that a signal reaches a reception side at an intended reception electric-field intensity and transmitting data is provided.

The wireless transmission processing unit 109 converts a frame to be transmitted through wireless communication into a baseband signal, processes the baseband signal as an analog signal, and supplies a transmission signal obtained as a result of the processing to the antenna control unit 110.

Here, in a case where a data frame is transmitted, the wireless transmission processing unit 109 is supplied with a data frame (a frame for transmitting transmission data) from the transmission frame construction unit 104 and management information (header information of the data frame) from the management information generation unit 106. The wireless transmission processing unit 109 causes the data frame to include the header information, and generates a transmission signal that corresponds to the data frame under the control of the transmission power control unit 108.

Furthermore, in a case where a control frame (including a multi-control frame) is transmitted, the wireless transmission processing unit 109 is supplied with the management information from the management information generation unit 106. This management information includes various parameters of a control frame or a multi-control frame. The wireless transmission processing unit 109 generates a transmission signal that corresponds to a control frame (a CTS frame, an ACK frame, or the like) or a multi-control frame (an MCH_RTS frame, an MCH_BAR frame, or the like) that is obtained from the management information, under the control of the control frame transmission processing unit 107 and the transmission power control unit 108.

The antenna control unit 110 is connected to a plurality of antenna elements. The antenna control unit 110 performs control to transmit a transmission signal supplied from the wireless transmission processing unit 109 via an antenna element through wireless communication. Furthermore, the antenna control unit 110 receives, via the antenna element, a wireless signal transmitted through wireless communication, and supplies the wireless signal to the wireless reception processing unit 111 and the detection threshold control unit 112.

In a case where a predetermined preamble signal has been detected from a reception signal supplied from the antenna control unit 110, under the control of the detection threshold control unit 112, the wireless reception processing unit 111 performs processing for receiving header information or a data portion that has been added after the predetermined preamble signal.

Here, in a case where a data frame has been received, the wireless reception processing unit 111 supplies header information of the data frame to the management information processing unit 114, and supplies the data frame to the reception data construction unit 115. Furthermore, in a case where a control frame (including a multi-control frame) has been received, the wireless reception processing unit 111 supplies the control frame (including the multi-control frame) to the control frame reception processing unit 113 and the management information processing unit 114.

In a case where transmission power control has been performed by the transmission power control unit 108, a signal detection level that enables detection of a wireless signal from (a communication apparatus 10 of) a base station AP or a terminal station STA within a corresponding range is set in the detection threshold control unit 112. Here, a function of performing control to detect a signal at a minimum necessary detection threshold in applying a space reuse technology is provided.

The control frame reception processing unit 113 is supplied with the control frame (including the multi-control frame) from the wireless reception processing unit 111. The control frame reception processing unit 113 performs processing for receiving the control frame (including the multi-control frame) supplied from the wireless reception processing unit 111, and supplies control frame reception information obtained as a result of the processing to the multichannel management unit 105, the control frame transmission processing unit 107, the detection threshold control unit 112, and the management information processing unit 114.

In this reception processing, a function of unitarily controlling processing in a case where a multi-control frame, such as an MCH_RTS frame or an MCH_BAR frame, has been received has been added, in addition to processing in a case where a current control frame, such as a CTS frame or an ACK frame, has been received.

The management information processing unit 114 is supplied with the header information or the control frame (including the multi-control frame) from the wireless reception processing unit 111, and the control frame reception information from the control frame reception processing unit 113. The management information processing unit 114 analyzes management information including header information or the like of a frame that has been actually transmitted through wireless communication on the basis of the header information or the control frame, and the control frame reception information, and extracts a parameter described in the frame in a case where the reception address information specifies the management information processing unit 114 itself.

For example, various parameters (for example, Available Channel Map, Requirement Bandwidth, or the like) of a multi-control frame such as an MCH_RTS frame or an MCH_BAR frame are also extracted here, and are supplied to the multichannel management unit 105. Furthermore, the management information processing unit 114 supplies the reception data construction unit 115 with information, such as header information, that has been obtained by analyzing the management information.

The reception data construction unit 115 removes predetermined header information from a data frame from the wireless reception processing unit 111 on the basis of the information, such as header information, that has been supplied from the management information processing unit 114, extracts only a required data portion, and writes the required data portion as reception data to the reception buffer 116.

The reception buffer 116 includes, for example, a semiconductor memory device such as a buffer memory. The reception buffer 116 transitorily stores the reception data written by the reception data construction unit 115. The reception data stored in the reception buffer 116 is appropriately read, and is output to the device control unit 13 via the interface 101.

In the wireless communication module 15 configured as described above, in particular, the multichannel management unit 105, the management information generation unit 106, the control frame transmission processing unit 107, the control frame reception processing unit 113, and the management information processing unit 114 perform processing relating to a multi-control frame such as an MCH_RTS including channel information and bandwidth information or an MCH_BAR frame including channel information.

Note that, in FIG. 14, respective units that are included in the wireless communication module 15 can be divided, for example, into three blocks, a transmission/reception data input/output unit 151, a control unit 152, and a front end unit 153, as illustrated with dotted-line frames.

Here, the transmission/reception data input/output unit 151 includes the interface 101, the transmission buffer 102, the network management unit 103, the transmission frame construction unit 104, the reception data construction unit 115, and the reception buffer 116, and processing or control that relates to input transmission data or output reception data is principally performed. Furthermore, the control unit 152 includes the multichannel management unit 105, the management information generation unit 106, the control frame transmission processing unit 107, the control frame reception processing unit 113, and the management information processing unit 114, and processing or control that relates to a frame such as a control frame or a multi-control frame is principally performed. Moreover, the front end unit 153 includes the transmission power control unit 108, the wireless transmission processing unit 109, the antenna control unit 110, the wireless reception processing unit 111, and the detection threshold control unit 112, and processing or control that relates to a signal such as a transmission signal or a reception signal is principally performed.

(Operation on Data Transmission Side)

Figure 15:
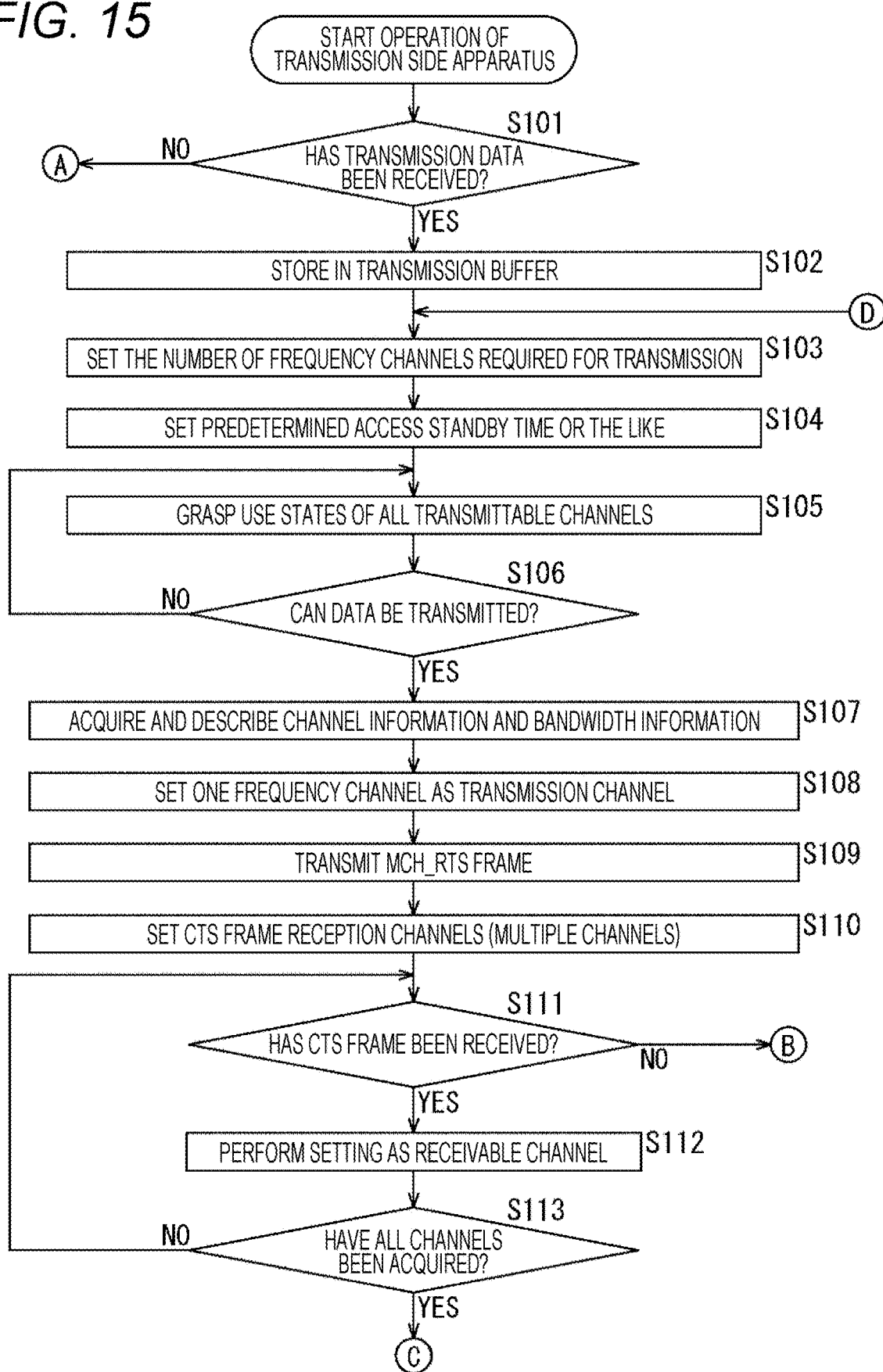
FIG. 15 is a flowchart explaining an operation of a communication apparatus on a data transmission side.
Figure 16:
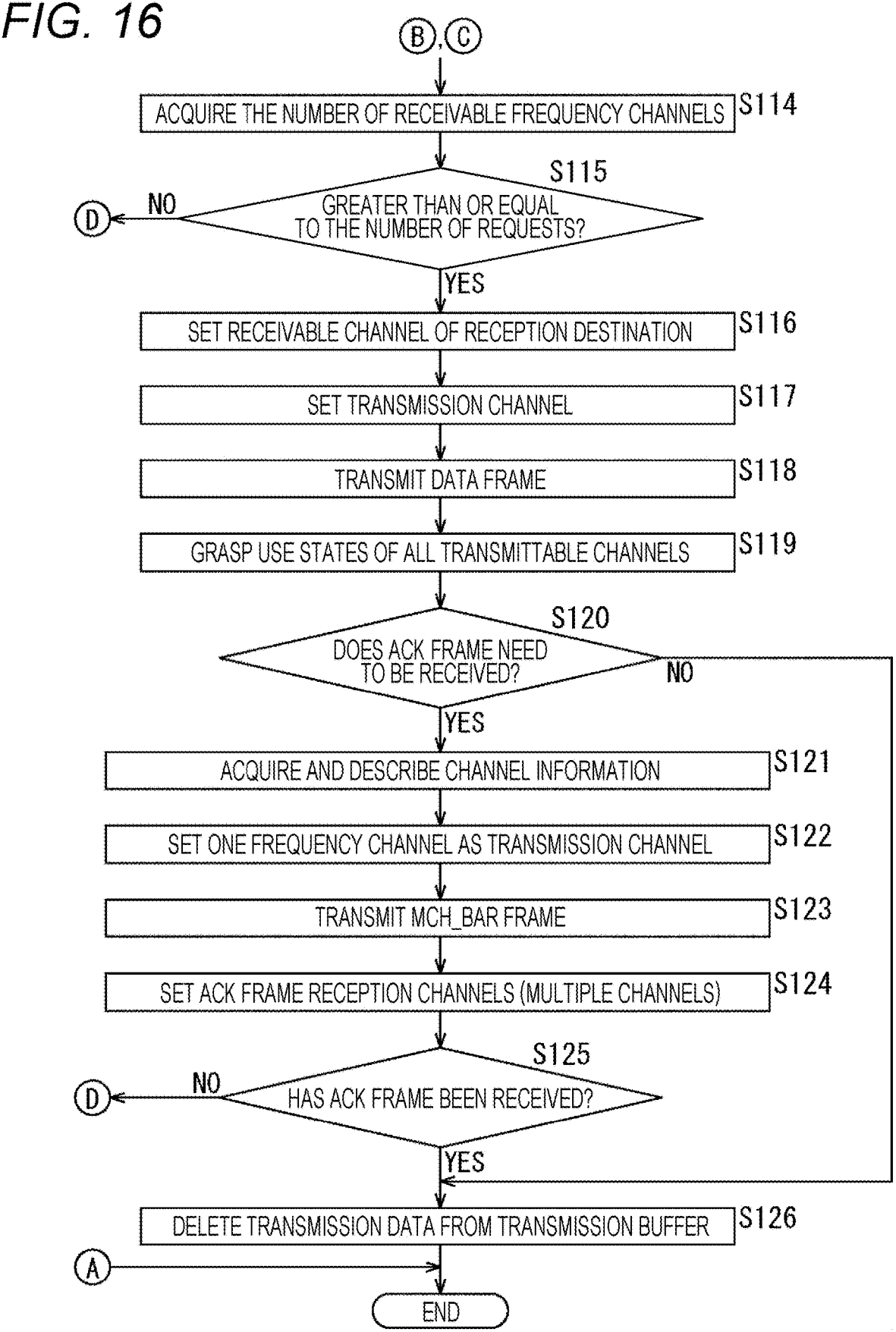
FIG. 16 is a flowchart explaining an operation of the communication apparatus on the data transmission side.

First, an operation of (a wireless communication module 15 of) a communication apparatus 10 on a data transmission side, such as base station AP10 or terminal station AP20 in FIG. 5, is described with reference to the flowcharts of FIGS. 15 and 16, for example.

In the wireless communication module 15, it is determined whether or not transmission data has been received via the interface 101 (S101). In a case where it has been determined that the transmission data has been received ("YES" in S101), the received transmission data is stored in the transmission buffer 102 (S102), and the process of step S103 and processes that follow are performed.

Stated another way, the multichannel management unit 105 sets the number of frequency channels (a bandwidth) required to transmit the transmission data on the basis of an amount of data of the transmission data stored in the transmission buffer 102 (S103). Furthermore, at this time, the multichannel management unit 105 also sets a predetermined access standby time for which a priority order is set according to a category of the transmission data, and a random standby time (S104).

Next, the multichannel management unit 105 grasps use states of transmission lines of all of the transmittable frequency channels (S105), and determines whether or not the transmission data can be transmitted (S106). Here, the processes of steps S105 and S106 are repeated. When it has been determined that the transmission data can be transmitted ("YES" in S106), the processing moves on to step S107.

The management information generation unit 106 acquires channel information relating to a frequency channel that enables (a data frame including) the transmission data to be transmitted at a timing at which the transmission data can be transmitted, and bandwidth information relating to a bandwidth of a frequency to be used to transmit the transmission data, and describes the channel information and the bandwidth information in (Available Channel Map and Requirement Bandwidth of) an MCH_RTS frame (S107). Furthermore, at this time, the control frame transmission processing unit 107 sets, as a transmission channel, one frequency channel in the channel information described in (Available Channel Map of) the MCH_RTS frame (S108).

Note that, here, a frequency channel regarded as a primary channel may be set as the transmission channel. Then, the wireless transmission processing unit 109 transmits the MCH_RTS frame by using the transmission channel that has been set in the process of step S108 (S109).

Next, the control frame reception processing unit 113 sets a plurality of frequency channels described as the channel information in the process of step S107 (multiple channels serving as what are called reception candidate channels) to be in a standby state for receiving a CTS frame (S110).

Then, in the wireless communication module 15, it is determined whether or not the CTS frame has been received from a communication apparatus 10 on a reception side (for example, a terminal station STA) by using the plurality of frequency channels (the reception candidate channels) that has been set in the process of step S110 (S111). In a case where it has been determined that the CTS frame has been received ('YES" in S111), the multichannel management unit 105 sets target reception candidate channels as receivable channels that enable the communication apparatus 10 on the reception side to receive the data frame (S112).

Furthermore, here, at almost the same timing, it is determined whether or not information relating to all of the frequency channels (the receivable channels) through which the CTS frame has been received has been acquired (S113). In a case where it has been determined that the information relating to all of the frequency channels has not been acquired ("NO" in S113), the processes of steps S111 to S113 are repeated. As described above, the processes of steps S111 to S113 are repeated in parallel, and therefore information relating to all of the frequency channels (the receivable channels) through which the CTS frame has been received is acquired.

Therefore, the multichannel management unit 105 acquires the number of frequency channels (a bandwidth) that enable reception in the communication apparatus 10 on the reception side (for example, the terminal station STA), the number of frequency channels (the bandwidth) being obtained by repeating the processes of steps S111 to S113 (S114).

Then, the multichannel management unit 105 compares the number of frequency channels (the bandwidth) required to transmit (the data frame including) the transmission data in the communication apparatus 10 on the transmission side (for example, the base station AP), the number of frequency channels (the bandwidth) being set in the process of step S103, with the number of frequency channels (the bandwidth) that enable the communication apparatus 10 on the reception side (for example, the terminal station STA) to receive (the data frame including) the transmission data, the number of frequency channels (the bandwidth) being acquired in the process of step S114, and determines whether or not the number or more of requested frequency channels (bandwidth) (the number or more of requests) can be set (S115).

Then, in a case where it has been determined that the number or more of requests can be set ("YES" in S115), the multichannel management unit 105 sets one or a plurality of frequency channels that can be set to be greater than or equal to the number of requests as a receivable channel of a reception destination (the communication apparatus 10 on the reception side) (S116). Furthermore, the control frame transmission processing unit 107 sets the receivable channel of the reception destination that has been set in the process of step S116, as a transmission channel of the transmission data (S117).

The wireless transmission processing unit 109 transmits the data frame including the transmission data by using the transmission channel that has been set in the process of step S117 (S118). Note that, here, during transmission of the data frame, similarly, a data frame or a CTS frame may be received from another communication apparatus 10 in order to sequentially grasp use states of all of the frequency channels that have been specified by the local apparatus to be transmittable (S119).

Furthermore, in the wireless communication module 15, it is determined whether or not an ACK frame need to be received (S120). In a case where it has been determined that the ACK frame need to be received ("YES" in S120), the process of step S121 and processes that follow are performed.

Stated another way, the management information generation unit 106 acquires channel information relating to frequency channels that enable the communication apparatus 10 on the reception side (for example, the terminal station STA) to transmit the ACK frame at a timing at which the ACK frame needs to be received, and describes the channel information in (Available Channel Map of) an MCH_BAR frame (S121). Furthermore, at this time, the control frame transmission processing unit 107 sets, as a transmission channel, one frequency channel in the channel information described in (Available Channel Map of) the MCH_BAR frame (S122).

Note that, here, a frequency channel regarded as a primary channel may be set as the transmission channel. Then, the wireless transmission processing unit 109 transmits the MCH_BAR frame by using the transmission channel that has been set in the process of step S122 (S123).

Alternatively, a frequency channel (a first frequency channel) to be used in transmission of the data frame (S118) may be set to be different from a frequency channel (a second frequency channel) to be used in transmission of the MCH_BAR frame (S123).

Next, the control frame reception processing unit 113 sets a plurality of frequency channels described as the channel information in the process of step S121 (multiple channels serving as what are called reception candidate channels) to be in a standby state for receiving an ACK frame (S124).

Then, in the wireless communication module 15, it is determined whether or not the ACK frame has been received by using any of the plurality of frequency channels (the reception candidate channels) that has been set in the process of step S124 (S125). In a case where it has been determined that the ACK frame has been received ("YES" in S125), from among pieces of transmission data stored in the transmission buffer 102, transmission data whose reception has been acknowledged by the ACK frame is deleted (S126).

Note that, in a case where it has been determined in the determination process of step S120 that the ACK frame need not to be received ("NO" in S120), processes relating to the ACK frame (S121 to S125) are skipped, the processing moves on to step S126, and the data stored in the transmission buffer 102 is deleted (S126). Furthermore, when the process of step S126 is finished, the processing illustrated in the flowcharts of FIGS. 15 and 16 is terminated.

Furthermore, in a case where it has been determined in the determination process of step S115 that the number of frequency channels (a bandwidth) required to transmit the transmission data fails to be prepared ("NO" in S115), or in a case where it has been determined in the determination process of step S125 that there is transmission data whose reception has not been acknowledged by an ACK frame ("NO" in S125), the processing returns to step S103, and the number of frequency channels (a bandwidth) required for transmission is selected again. Furthermore, in a case where it has been determined in the determination process of step S101 that no transmission data has been received ("NO" in S101), processes that follow are not performed, and the processing is terminated.

An operation of a communication apparatus on a data transmission side has been described above.

(Operation on Data Reception Side)

Figure 17:
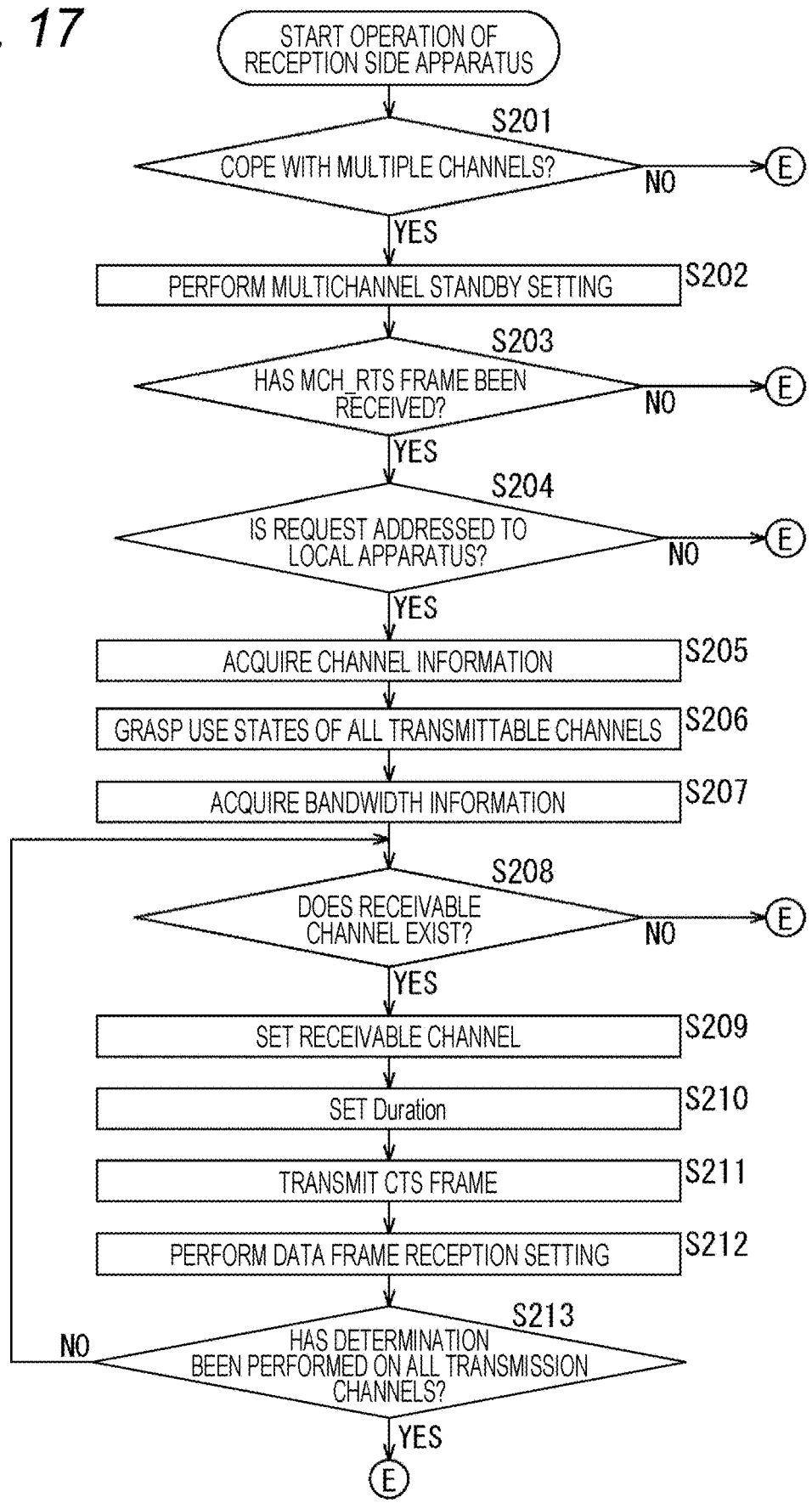
FIG. 17 is a flowchart explaining an operation of a communication apparatus on a data reception side.
Figure 18:
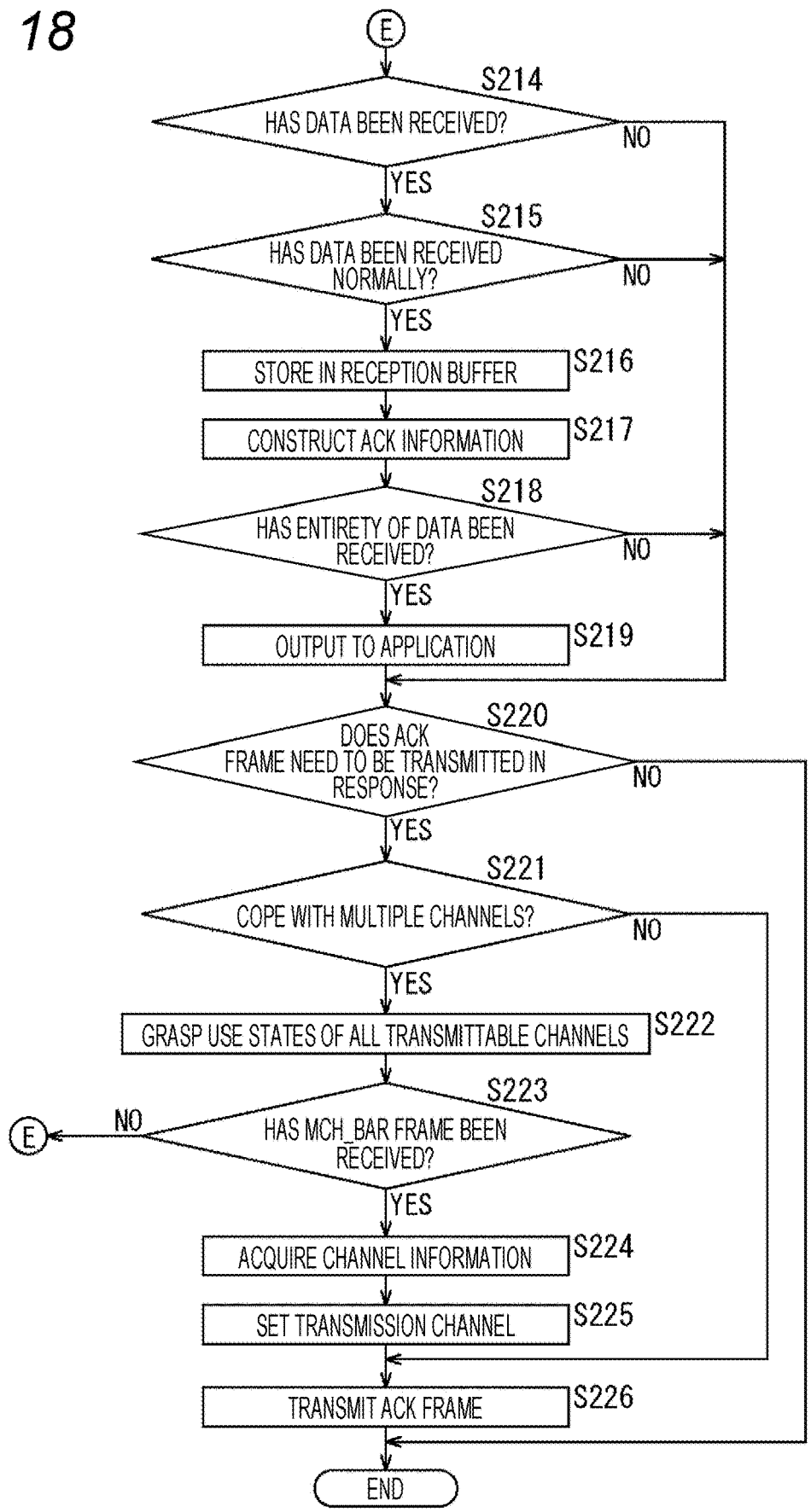
FIG. 18 is a flowchart explaining an operation of the communication apparatus on the data reception side.

Next, an operation of (a wireless communication module 15 of) a communication apparatus 10 on a data reception side, such as terminal station STA12 or terminal station STA21 in FIG. 5, is described with reference to the flowcharts of FIGS. 17 and 18, for example.

In the wireless communication module 15, it is determined whether or not the local apparatus is (a wireless communication module 15 of) a communication apparatus 10 that copes with multiple channels (S201). In a case where it has been determined in the determination process of step S201 that the local apparatus copes with multiple channels and that a user desires to set communication using multiple channels ("YES" in S201), in the wireless communication module 15, setting is performed to be in a standby state for reception using multiple channels (S202), and the process of step S203 and processes that follow are performed.

Stated another way, in a case where the wireless reception processing unit 111 has received an MCH_RTS frame ("YES" in S203), the control frame reception processing unit 113 checks whether or not the MCH_RTS frame is an MCH_RTS frame addressed to the local apparatus (a request in which the local apparatus has been set as a reception destination) (S204).

Then, in a case where the MCH_RTS frame addressed to the local apparatus has been received ("YES" in S204), the control frame reception processing unit 113 acquires channel information described in (Available Channel Map of) the MCH_RTS frame addressed to the local apparatus (S205), and grasps use states of transmission lines of all of the frequency channels that enable the communication apparatus 10 on the transmission side (for example, a base station AP) to transmit (a data frame including) transmission data (S206).

Furthermore, the control frame reception processing unit 113 acquires bandwidth information described in (Requirement Bandwidth of) the MCH_RTS frame addressed to the local apparatus (S207). Then, the multichannel management unit 105 determines whether or not there is a frequency channel that enables reception with the local apparatus as a reception destination from among the transmittable frequency channels, on the basis of the channel information and the bandwidth information (S208).

Here, in a case where there is a frequency channel that enables reception with the local apparatus as a reception destination ("YES" in S208), the control frame transmission processing unit 107 sets the frequency channel as a receivable channel (S209), and sets a duration of data transmission as Duration information (S210). Therefore, the wireless transmission processing unit 109 transmits a CTS frame by using the receivable channel that has been set in the process of step S209 (S211).

Furthermore, the control frame reception processing unit 113 sets the receivable channel set in the process of step S209 to be in a standby state for receiving the data frame (S212). As described above, a receivable channel selected from transmittable frequency channels is a reception channel for receiving a data frame, and is also a transmission channel for transmitting a CTS frame.

Note that, in this setting of a receivable channel, for example, until determination has been performed on all of the frequency channels that have been determined by (the wireless communication module 15 of) the communication apparatus 10 on the data transmission side, such as base station AP10 in FIG. 5, to be transmittable ("YES" in S213), the processing returns to step S208, and the processes of steps S208 to S213 are repeated.

Accordingly, a frequency channel that enables a communication apparatus 10 on a reception side (for example, a terminal station STA) to receive (a data frame including) transmission data can be selected from frequency channels that enable a communication apparatus 10 on a transmission side (for example, a base station AP) to transmit (the data frame including) the transmission data, and a bandwidth of a frequency to be used to transmit the data frame can be secured (the number of frequency channels required to transmit the data frame can be secured).

Thereafter, in the wireless communication module 15, it is determined whether or not the data frame has been received by using the receivable channel that has been set by repeating the processes of steps S208 to S213 (S214). In a case where it has been determined that the data frame has been received ("YES" in step S214), it is further determined whether or not reception data stored in the data frame has been able to be received normally (S215).

Then, in the wireless communication module 15, in a case where it has been determined that the reception data has been able to be received normally ("YES" in S215), the reception data is stored in the reception buffer 116 (S216), and a sequence number or the like serving as ACK information of the reception data is constructed (S217). Furthermore, in the wireless communication module 15, it is determined whether or not the entirety of reception data has been received (S218). In a case where the entirety of reception data has been received ("YES" in S218), the reception data stored in the reception buffer 116 is output to an application in a protocol upper layer via the interface 101 (S219).

When the process of step S219 is finished, the processing moves on to step S220. Note that, in a case where it has been determined that no data frame has been received ("NO" in S214), in a case where it has been determined that reception data fails to be received normally ("NO" in S215), or in a case where it has been determined that the entirety of reception data has not been received ("NO" in S218), similarly, the processing moves on to step S220.

Here, for example, in a case where a bandwidth of a frequency to be used to transmit the data frame has failed to be secured, stated another way, in a case where the communication apparatus 10 on the data transmission side (the base station AP) has determined that setting fails to be performed in such a way that the number of receivable channels set according to reception of a CTS frame is greater than or equal to the number of requested frequency channels (a bandwidth) (is greater than or equal to the number of requests) ("NO" in S115 of FIG. 16), it is determined that the data frame has not yet been transmitted (S118 of FIG. 16 has not yet been performed), and the communication apparatus 10 on the data reception side (the terminal station STA) determines that the data frame has not yet been received ("NO" in S214).

In the wireless communication module 15, it is determined whether or not an ACK frame need to be transmitted in response (S220). In a case where it has been determined that the ACK frame need to be transmitted in response ("YES" in S220), it is further determined whether or not the local apparatus copes with multiple channels (S221). Then, in a case where it has been determined that the local apparatus copes with multiple channels ("YES" in S221), the multichannel management unit 105 grasps use states of transmission lines of all of the transmittable frequency channels (S222).

Furthermore, in the wireless communication module 15, it is determined whether or not an MCH_BAR frame has been received (S233). Then, in a case where it has been determined that the MCH_BAR frame has been received ("YES" in S233), the control frame reception processing unit 113 acquires channel information that is described in (Available Channel Map of) the MCH_BAR frame and relates to a frequency channel that enables the communication apparatus 10 on the reception side to transmit an ACK frame (for example, the terminal station STA) (S224).

At this time, a transmission channel (a first frequency channel) to be used in reception of the data frame (S214) is set to be different from a transmission channel (a second frequency channel) to be used in reception of the MCH_BAR frame (S223) in some cases, and reception is performed by using all of the channels.

Furthermore, the control frame transmission processing unit 107 sets, as a transmission channel, at least one channel frequency in the channel information acquired in the process of step S224 (S225). Therefore, the wireless transmission processing unit 109 transmits an ACK frame by using the transmission channel that has been set in the process of step S225 (S226).

Note that, in a case where it has been determined in the determination process of step S221 that the local apparatus does not cope with multiple channels ("NO" in S221), the processes of steps S222 to S225 are skipped, and an ACK frame is transmitted by using a single transmission channel (S226). Furthermore, in a case where it has been determined in the determination process of step S220 that an ACK frame need not to be transmitted ("NO" in S220), the processes of steps S221 to S226 are skipped, and it is determined that an ACK frame has not yet been transmitted. Furthermore, when the process of step S226 is finished, the processing illustrated in the flowcharts of FIGS. 17 and 18 is terminated.

Furthermore, in a case where it has been determined in the determination process of step S203 that an MCH_RTS frame has not been received ("NO" in S203), in a case where it has been determined in the determination process of step S204 that an MCH_RTS frame is addressed to another communication apparatus 10 ("NO" in S204), or in a case where it has been determined in the determination process of step S208 that there are no receivable frequency channels ("NO" in S208), the processing moves on to step S214, and an operation to receive a data frame is performed.

An operation of a communication apparatus on a data reception side has been described above.

As described above, in a communication method to which the present technology has been applied (a new scheme), in a wireless LAN system that transmits or receives data by using a plurality of frequency channels each having, for example, a bandwidth of 20 MHz as a single channel, a communication apparatus 10 on a transmission side (for example, a base station AP) transmits a request frame (an MCH_RTS frame) that includes information (channel information) relating to available channel resources and information (bandwidth information) relating to a 20 MHz-bandwidth channel amount. On the other hand, a communication apparatus 10 on a reception side (for example, a terminal station STA) selects at least one or more available channel resources on the basis of information of the request frame, and transmits a response frame (a CTS frame) in response, by using the selected frequency channels.

Accordingly, in a wireless LAN system, in performing communication between a communication apparatus 10 on a data transmission side (for example, a base station AP) and a communication apparatus 10 on a data reception side (for example, a terminal station STA), communication can be performed by using an idle channel in accordance with a use state of a plurality of frequency channels. Stated another way, communication can be performed by using a frequency channel that is not used in basic service sets (BSS) that are adjacent to overlap each other. For example, as illustrated in FIG. 4, in a case where a frequency channel is used in units of 240 MHz or 320 MHz, a bandwidth is broad, and therefore there is a very high possibility of overlapping with another frequency channel. However, in the communication method to which the present technology has been applied (the new scheme), an idle channel can be selected in accordance with a use state of a plurality of frequency channels, and this can avoid overlapping of frequency bands.

Furthermore, communication can be performed by using an optimum frequency channel in accordance with a transmission-line use state of a communication apparatus 10 on a data reception side (for example, a terminal station STA) in addition to a transmission-line use state of a communication apparatus 10 on a data transmission side (for example, a base station AP). Therefore, even if frequency channels that operate in a wireless LAN system according to a current scheme are employed, access control can be performed while keeping compatibility with a communication apparatus (a legacy terminal) coping with the current scheme.

Moreover, in a wireless LAN system, after transmitting data, a communication apparatus 10 on a transmission side (for example, a base station AP) transmits a request frame (an MCH_BAR frame) that includes information (channel information) relating to available channel resources. Therefore, a communication apparatus 10 on a data reception side (for example, a terminal station STA) can select a frequency channel that enables an ACK frame to be transmitted in response, in a case where the ACK frame is transmitted in response after the data has been received. Accordingly, the communication apparatus 10 on the data reception side can transmit an ACK frame in response, by using a frequency channel that does not have a possibility of other communication being performed, and therefore the ACK frame can be reliably transmitted in response.

Here, Patent Document 1 described above discloses a technology in which only one frequency channel that a receiver can use in transmission or reception can be selected from a plurality of frequency channels, and it is assumed that a frequency channel that enables transmission and reception is selected in consideration of reception of a data frame and subsequent transmission (transmission in response) of an ACK frame. In contrast to this, in the present technology, in transmitting (transmitting in response) an ACK frame after receiving a data frame, an available frequency channel is selected by using an MCH_BAR frame every time. Therefore, a frequency channel that only enables the data frame to be received can also be selected. Therefore, in a configuration according to the present technology, a larger number of frequency channels, including a frequency channel that is not selected in the configuration of Patent Document 1 described above (a frequency channel that only enables a data frame to be received), can be used, and this enables improvements in efficiency of utilization of a transmission line.

Furthermore, Patent Document 1 described above discloses a technology for measuring power density in order to detect occupation of a channel due to interference caused by another device and determining an ID of an occupied channel. However, in a state where a network allocation vector (NAV) has been set due to detection of a virtual carrier, recognition as an occupied channel is not performed. Therefore, there is a possibility that collision will occur when such a channel is used. In contrast to this, in the present technology, a frequency channel for which the network allocation vector (NAV) has been set is recognized, and a frequency channel that is different from the frequency channel is selected. Therefore, such collision can be avoided.

Note that Document A described above discloses a configuration in which channel information that has been allocated in advance to each terminal is transmitted as an RTS frame (multi-user RTS) by using a primary channel and data is transmitted upon receipt of a CTS frame from each of the terminals. However, a transmission channel of data has been allocated in advance to each of the terminals, and if the network allocation vector (NAV) has been set, a response with a CTS frame fails to be transmitted, nor does data fail to be transmitted. In contrast to this, in the present technology, in transmitting (transmitting in response) a CTS frame, an available frequency channel is selected by using an MCH_RTS frame every time. Therefore, such a situation where data fails to be transmitted can be avoided.

Furthermore, Document B described below discloses a configuration in which a requesting-channel bandwidth is described in an RTS frame and a CTS frame includes a field that authorizes the requesting-channel bandwidth. The RTS frame and the CTS frame are respectively transmitted by using a bandwidth that corresponds to the number of requesting channels and a bandwidth that corresponds to the number of responding channels, but both bandwidths have the same center frequency. In contrast to this, in the present technology, in transmitting (transmitting in response) a CTS frame, an available frequency channel is selected by using an MCH_RTS frame every time. Therefore, an idle channel can be selected in accordance with a use state of a plurality of frequency channels.

Document B: Japanese Patent Application Laid-Open No. 2014-195266

2. Variations (Example of Another Configuration)

In the description above, it has been described that a communication apparatus 10 is configured as a base station AP or a terminal station STA. However, a communication apparatus to which the present technology has been applied may be configured as the base station AP or the terminal station STA, or may be configured as part (for example, a wireless communication module, a wireless chip, or the like) of an apparatus that configures the base station AP or the terminal station STA.

Furthermore, the terminal station STA can be configured, for example, as an electronic device having a wireless communication function, such as a smartphone, a tablet type terminal, a portable telephone, a personal computer, a digital camera, a game machine, a television receiver, a wearable terminal, or a speaker device.

Furthermore, in the description above, it has been described that the base station AP is a communication apparatus 10 on a data transmission side and the terminal station STA is a communication apparatus 10 on a data reception side. However, the transmission side and the reception side may be reversed in such a way that the terminal station STA is the communication apparatus 10 on the data reception side and the base station AP is the communication apparatus 10 on the data transmission side. In this case, the terminal station STA performs the operation on the data transmission side that is illustrated in the flowcharts of FIGS. 15 and 16, and the base station AP performs the operation on the data reception side that is illustrated in the flowcharts of FIGS. 17 and 18.

Note that an embodiment of the present technology is not limited to the embodiment described above, and various changes can be made without departing from the gist of the present technology.

Furthermore, the present technology can employ the configuration described below.

(1)

A communication apparatus including a control unit that performs control to:

generate channel information relating to transmittable frequency channels of data, and bandwidth information relating to a bandwidth of a frequency to be used to transmit the data;

transmit a request signal to another communication apparatus, by using a frequency channel that has been selected from the transmittable frequency channels, the request signal including the channel information and the bandwidth information that have been generated; and transmit the data to the other communication apparatus, by using frequency channels that have been selected as receivable frequency channels by the other communication apparatus.

(2)

The communication apparatus described in (1) described above, in which the channel information includes a frequency channel that is selectable by the other communication apparatus.

(3)

The communication apparatus described in (1) or (2) described above, in which the channel information includes a frequency channel that enables selection of a bandwidth that is broader than the bandwidth of the frequency to be used to transmit the data.

(4)

The communication apparatus described in any of (1) to (3) described above, in which the control unit performs control to:

receive a response signal to be transmitted from the other communication apparatus, by using the receivable frequency channels of the other communication apparatus; and select a frequency channel to be used from the receivable frequency channels on the basis of the response signal that has been received.

(5)

The communication apparatus described in (4) described above, in which the request signal includes a request to send (RTS) frame that copes with multiple channels, and the response signal includes a clear to send (CTS) frame.

(6)

A communication apparatus including a control unit that performs control to:

receive a request signal to be transmitted from another communication apparatus, by using a frequency channel that has been selected from transmittable frequency channels, the request signal including channel information relating to the transmittable frequency channels that enable the other communication apparatus to transmit data, and bandwidth information relating to a bandwidth of a frequency to be used to transmit the data;

select a receivable frequency channel from the transmittable frequency channels on the basis of the channel information and the bandwidth information that are included in the request signal that has been received; and transmit a response signal to the other communication apparatus, by using the receivable frequency channel that has been selected.

(7)

The communication apparatus described in (6) described above, in which the control unit performs control to receive the data to be transmitted from the other communication apparatus, by using the receivable frequency channel that has been selected, after transmitting the response signal.

(8)

The communication apparatus described in (6) or (7) described above, in which the channel information includes a frequency channel that is selectable by the communication apparatus.

(9)

The communication apparatus described in (8) described above, in which the channel information includes a frequency channel that enables selection of a bandwidth that is broader than the bandwidth of the frequency to be used to transmit the data.

(10)

The communication apparatus described in any of (6) to (9) described above, in which the request signal includes an RTS frame that copes with multiple channels, and the response signal includes a CTS frame.

(11)

A communication apparatus including a control unit that performs control to:

transmit data to another communication apparatus, by using a first frequency channel;

generate a request signal requesting acknowledgment of normal reception of the data, the request signal including channel information relating to transmittable frequency channels that enable the other communication apparatus to transmit an acknowledgment signal; and transmit the request signal that has been generated to the other communication apparatus, by using a second frequency channel that has been selected from the transmittable frequency channels.

(12)
The communication apparatus described in (11) described above,
in which the second frequency channel is different from the first frequency channel.
(13)
The communication apparatus described in (11) or (12) described above,
in which the control unit performs control to receive the acknowledgment signal to be transmitted from the other communication apparatus, by using a frequency channel that the other communication apparatus has selected from the transmittable frequency channels.
(14)
The communication apparatus described in any of (11) to (13) described above,
in which the channel information includes a frequency channel that is selectable by the other communication apparatus.
(15)
The communication apparatus described in any of (11) to (14) described above,
in which the control unit performs control to receive the acknowledgment signal to be transmitted from the other communication apparatus, by using the transmittable frequency channels.
(16)
The communication apparatus described in any of (11) to (15) described above,
in which the request signal includes a block ack request (BAR) frame that copes with multiple channels, and
the acknowledgment signal includes an acknowledgment (ACK) frame.
(17)
A communication apparatus including
a control unit that performs control to:
receive data to be transmitted from another communication apparatus, by using a first frequency channel;
receive a request signal to be transmitted from the other communication apparatus, by using a second frequency channel, the request signal requesting acknowledgment of normal reception of the data and including channel information relating to transmittable frequency channels that enable an acknowledgment signal to be transmitted;
select a frequency channel from the transmittable frequency channels on the basis of the channel information included in the request signal that has been received, in a case where the data has been received normally; and
transmit the acknowledgment signal to the other communication apparatus, by using the frequency channel that has been selected.
(18)
The communication apparatus described in (17) described above,
in which the second frequency channel is different from the first frequency channel.
(19)
The communication apparatus described in (17) or (18) described above,
in which the channel information includes a frequency channel that is selectable by the communication apparatus.

(20)
The communication apparatus described in any of (17) to (19) described above,
in which the request signal includes a BAR frame that copes with multiple channels, and
the acknowledgment signal includes an ACK frame.

REFERENCE SIGNS LIST

10 Communication apparatus
11 Internet connection module
12 Information input module
13 Device control unit
14 Information output module
15 Wireless communication module
101 Interface
102 Transmission buffer
103 Network management unit
104 Transmission frame construction unit
105 Multichannel management unit
106 Management information generation unit
107 Control frame transmission processing unit
108 Transmission power control unit
109 Wireless transmission processing unit
110 Antenna control unit
111 Wireless reception processing unit
112 Detection threshold control unit
113 Control frame reception processing unit
114 Management information processing unit
115 Reception data construction unit
116 Reception buffer
151 Transmission/reception data input/output unit
152 Control unit
153 Front end unit
AP Base station
STA Terminal station

The invention claimed is:
1. A communication apparatus configured to operate as a first mobile terminal in communication with a first base station and comprising a control circuit that performs control to:
detect a signal that is transmitted by a second mobile terminal to a second base station via a first frequency channel of a plurality of predetermined frequency channels identified for multi-station multi-channel communications;
receive a multichannel information signal from the first base station via a frequency channel of the plurality of predetermined frequency channels that has been predetermined for transmitting multichannel information signals by multiple base stations, the multichannel information signal including channel information and bandwidth information;
in response to the multichannel information signal, based on the channel information and the bandwidth information:
select at least two frequency channels from a plurality of predetermined frequency channels available to the mobile terminal for transmitting data,
wherein the selected at least two of the frequency channels are any of the plurality of predetermined frequency channels other than:
the first frequency channel of the detected first signal, and the frequency channel of the plurality of predetermined frequency channels that has been predetermined for transmitting multichannel information signals; and transmit second signals to the first base station via the selected at least two of the frequency channels;

receive the data from the first base station via the selected at least two of the frequency channels; and transmit an acknowledgement to the received data via at least one of the selected at least two of the frequency channels.

2. The communication apparatus of claim 1, wherein the control circuit is configured to transmit the acknowledgement to the received data in response to a request received from the first base station.

3. The communication apparatus of claim 1, wherein:
the channel information includes information identifying the at least two of the plurality of predetermined frequency channels that are available to the first base station for transmitting data to the first mobile terminal, and
the bandwidth information includes information relating to a bandwidth of a frequency to be used by the mobile terminal for transmitting the data to the first mobile terminal.

4. A method performed by a communication apparatus configured to operate as a first mobile terminal in communication with a first base station, the method comprising:
detecting a signal that is transmitted by a second mobile terminal to a second base station via a first frequency channel of a plurality of predetermined frequency channels identified for multi-station multi-channel communications;
receiving a multichannel information signal from the first base station via a frequency channel of the plurality of predetermined frequency channels that has been predetermined for transmitting multichannel information signals by multiple base stations, the multichannel information signal including channel information and bandwidth information;
in response to the multichannel information signal, based on the channel information and the bandwidth information:
selecting at least two frequency channels from a plurality of predetermined frequency channels available to the mobile terminal for transmitting data, wherein the selected at least two of the frequency channels are any of the plurality of predetermined frequency channels other than:
the first frequency channel of the detected first signal, and
the frequency channel of the plurality of predetermined frequency channels that has been predetermined for transmitting multichannel information signals; and
transmitting second signals to the first base station via the selected at least two of the frequency channels;
receiving the data from the first base station via the selected at least two of the frequency channels; and
transmitting an acknowledgement to the received data via at least one of the selected at least two of the frequency channels.

5. The method of claim 4, wherein the acknowledgement to the received data is transmitted in response to a request received from the first base station.

6. The method of claim 4, wherein:
the channel information includes information identifying the at least two of the plurality of predetermined frequency channels that are available to the first base station for transmitting data to the first mobile terminal, and
the bandwidth information includes information relating to a bandwidth of a frequency to be used by the mobile terminal for transmitting the data to the first mobile terminal.

\* \* \* \* \*